(12) United States Patent
Hayashida

(10) Patent No.: US 9,646,736 B2
(45) Date of Patent: May 9, 2017

(54) AROMATIC POLYCARBONATE RESIN COMPOSITION AND MOLDED ARTICLE THEREOF

(75) Inventor: Atsushi Hayashida, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 447 days.

(21) Appl. No.: 13/978,250

(22) PCT Filed: Jan. 5, 2012

(86) PCT No.: PCT/JP2012/050532
§ 371 (c)(1),
(2), (4) Date: Oct. 2, 2013

(87) PCT Pub. No.: WO2012/096358
PCT Pub. Date: Jul. 19, 2012

(65) Prior Publication Data
US 2014/0014884 A1    Jan. 16, 2014

(30) Foreign Application Priority Data

Jan. 14, 2011  (JP) ................................ 2011-005981

(51) Int. Cl.
*H01B 1/06*        (2006.01)
*H01B 1/24*        (2006.01)
(Continued)

(52) U.S. Cl.
CPC ............... *H01B 1/24* (2013.01); *C08L 69/00* (2013.01); *C08K 3/04* (2013.01); *C08L 67/02* (2013.01); *C08L 67/025* (2013.01)

(58) Field of Classification Search
CPC .............................. C08K 3/04; C08G 63/6884
(Continued)

(56) References Cited

U.S. PATENT DOCUMENTS

2008/0176048 A1 * 7/2008 Onizawa ............. B29C 45/0001
428/195.1

FOREIGN PATENT DOCUMENTS

EP       0940443 A1 * 3/1999   ............. C08L 67/00
JP       62-273252    11/1987
(Continued)

OTHER PUBLICATIONS

International Search Report issued Feb. 7, 2012 in International (PCT) Application No. PCT/JP2012/050532.
(Continued)

*Primary Examiner* — Khanh Tuan Nguyen
(74) *Attorney, Agent, or Firm* — Wenderoth, Lind & Ponack, L.L.P.

(57) ABSTRACT

A resin composition which has high electrical conductivity and high stiffness, is suppressed in outgassing caused by a temperature rise and is excellent in heat stability during melt molding in the production process and a molded article thereof.

The resin composition comprises (A) 65 to 85 parts by weight of an aromatic polycarbonate resin (component A), (B) 15 to 35 parts by weight of graphite having an average particle diameter of 5 to 60 μm (component B), and (C) 0.1 to 5 parts by weight of at least one compound (component C) selected from the group consisting of a polyester having a sulfonate group (component C-1) and a polyether ester having a sulfonate group (component C-2) based on 100 parts by weight of the total of the components A and B.

5 Claims, 1 Drawing Sheet

(51) Int. Cl.
*C08L 69/00* (2006.01)
*C08K 3/04* (2006.01)
*C08L 67/02* (2006.01)

(58) Field of Classification Search
USPC .......................................... 252/511; 428/195.1
See application file for complete search history.

(56) References Cited

FOREIGN PATENT DOCUMENTS

| | | | | |
|---|---|---|---|---|
| JP | 9-249805 | | 9/1997 | |
| JP | 10-237316 | | 9/1998 | |
| JP | 2000-119405 | | 4/2000 | |
| JP | 2001-200153 | | 7/2001 | |
| JP | 2001-323150 | | 11/2001 | |
| JP | 2004-161980 | | 6/2004 | |
| JP | 2006-199732 | | 8/2006 | |
| JP | 2006-273931 | | 10/2006 | |
| JP | 2007-063361 | * | 3/2007 | ............. C08L 69/00 |
| JP | 2007-63361 | | 3/2007 | |
| JP | 2008-163270 | * | 7/2008 | ............. C08L 69/00 |
| JP | 2011-111560 | | 6/2011 | |

OTHER PUBLICATIONS

International Preliminary Report on Patentability issued Jul. 16, 2013 and English translation of Written Opinion of the International Searching Authority issued Feb. 7, 2012 in International Application No. PCT/JP2012/050532.
Sumita, M., "Dispersion of Conductive Particles in Filled Polymers", Journal of the Adhesion Society of Japan, vol. 23, No. 3, 1987, pp. 103-111, cited in specification.

* cited by examiner

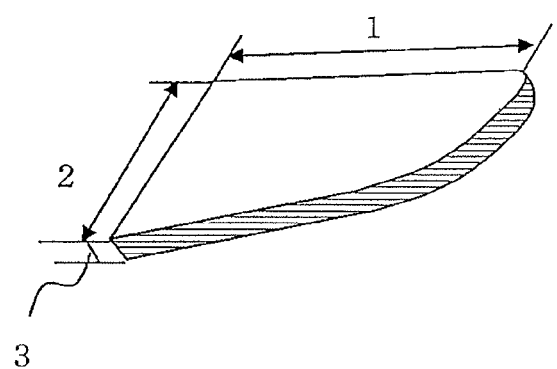

AROMATIC POLYCARBONATE RESIN COMPOSITION AND MOLDED ARTICLE THEREOF

TECHNICAL FIELD

The present invention relates to a resin composition comprising graphite and an aromatic polycarbonate resin. More specifically, it relates to a resin composition which has excellent electrical conductivity and stiffness and is suppressed in outgassing caused by a temperature rise while exhibiting excellent heat stability during melt molding in the production process, and a resin molded article obtained by molding the resin composition.

BACKGROUND ART

Thermoplastic resins are widely used in all the industrial fields due to their production ease and molding ease. Since aromatic polycarbonate resins in particular exhibit excellent electrical insulating properties, heat resistance and impact resistance, they are often used in electronic parts such as semiconductors and electronic circuit boards, electronic devices and containers used for the storage and transportation of precision instruments. Since electronic parts are becoming smaller in size and more functional; a thermoplastic resin having both the electrical conductivity and stiffness of a thermoplastic resin molded article is desired. The size reduction and upgrading of electronic parts lead to the generation of heat from the electronic parts, and a gas generated from a resin molded article by a temperature rise causes instability due to the contamination of a head or the levitation of a disk in the interior parts of storage AV equipment. Therefore, outgas reduction property is required for a thermoplastic resin in use. However, there has been no resin composition which has outgas reduction property as well as electrical conductivity and stiffness up till now.

The addition of carbon black is one of the typical methods of providing electrical conductivity to thermoplastic resins. For example, there is known a resin composition which comprises an aromatic polycarbonate, polyalkylene terephthalate and carbon black having specific DBP oil absorptivity in a specific ratio and has the improved dispersibility of the carbon black (refer to Patent Document 1 and non-Patent Document 1). Although it is for sure that electrical conductivity can be easily provided by adding carbon black, this resin composition has low stiffness and therefore, is not suitable for use as an interior member for storage AV equipment.

The addition of graphite is known as means of providing stiffness and electrical conductivity to a thermoplastic resin, and a resin composition whose heat stability has been improved by using a phosphorus-based stabilizer is known (refer to Patent Document 2). Also, a resin composition whose anisotropy has been improved by adding mainly carbon fibers to a thermoplastic resin is known (refer to Patent Document 3). Conductive fillers such as the above carbon fibers, metal fibers, metal flakes, metal coated fibers including conductive titanium oxide, and metal coated flakes including conductive mica have been used to improve mechanical properties. Further, it is known that a resin composition having excellent dimensional stability and high stiffness and electrical conductivity is obtained by using a combination of carbon fibers and graphite which is a conductive filler (refer to Patent Document 4). However, it is hardly said that these documents disclose an adequate knowledge of outgas reduction and fail to disclose an effective knowledge to obtain excellent outgas reduction property.

(Patent Document 1) JP-A 2001-323150
(Patent Document 2) JP-A 2001-200153
(Patent Document 3) JP-A 2000-119405
(Patent Document 4) JP-A 10-237316
(Non-Patent Document 1) Journal of the Adhesion Society of Japan, Vol. 23, No. 3, p. 103-111 (1987)

DISCLOSURE OF THE INVENTION

It is an object of the present invention to provide an aromatic polycarbonate resin composition which has high electrical conductivity, high stiffness, outgas reduction property and excellent melt heat stability as well as high productivity and a resin molded article thereof.

The inventor of the present invention found that when graphite having a specific shape is used and also at least one compound selected from the group consisting of a polyether ester having a sulfonate group and a polyester having a sulfonate group is contained, excellent outgas reduction property and melt heat stability can be achieved and high electrical conductivity and stiffness can be obtained as well. It is assumed that this effect is due to the fact that a suitable reinforcing effect and dimensional stability are provided by graphite having a specific shape and the inactivation of a functional group on the surface of graphite and impurities by at least one compound selected from the group consisting of a polyether ester having a sulfonate group and a polyester having a sulfonate group effectively serves to improve outgas reduction property and melt heat stability.

According to the present invention, the above object is attained by the following invention.

1. A resin composition comprising:
   (A) 65 to 85 parts by weight of an aromatic polycarbonate resin (component A);
   (B) 15 to 35 parts by weight of graphite having an average particle diameter of 5 to 60 μm (component B); and
   (C) 0.1 to 5 parts by weight of at least one compound (component C) selected from the group consisting of a polyester having a sulfonate group (component C-1) and a polyether ester having a sulfonate group (component C-2) based on 100 parts by weight of the total of the components A and B.

2. The resin composition in the above paragraph 1, wherein the component B is graphite having an average ratio of the length in the longitudinal direction to the thickness of not less than 30.

3. The resin composition in the above paragraph 1, wherein the component C-1 is a polyester comprising (C1-1) a recurring unit derived from an aromatic dicarboxylic acid component having no sulfonate group, (C1-2) a recurring unit derived from an aromatic dicarboxylic acid component substituted by a sulfonate group and represented by the following general formula [1], and (C1-3) a recurring unit derived from a glycol component having 2 to 10 carbon atoms.

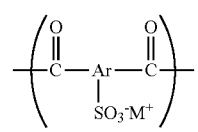

[1]

(In the above formula, Ar is a trivalent aromatic group having 6 to 20 carbon atoms, and M+ is a metal ion or an organic onium ion.)
4. The resin composition in the above paragraph 1, wherein the component C-2 is a polyether ester comprising (C2-1) a recurring unit derived from an aromatic dicarboxylic acid component having no sulfonate group, (C2-2) a recurring unit derived from an aromatic dicarboxylic acid component substituted by a sulfonate group and represented by the following general formula [1], (C2-3) a recurring unit derived from a glycol component having 2 to 10 carbon atoms, and (C2-4) a recurring unit derived from a poly(alkylene oxide)glycol component having a number average molecular weight of 200 to 50,000.

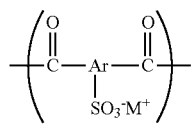

[1]

(In the above formula, Ar is a trivalent aromatic group having 6 to 20 carbon atoms, and M+ is a metal ion or an organic onium ion.)
5. A molded article formed from the resin composition of any one of the above paragraphs 1 to 4.
6. The molded article in the above paragraph 5 which is a storage AV equipment part.
7. The molded article in the above paragraph 6 which is an air rectifier plate for hard disk drives (HDD) or digital versatile disk (DVD) drives.
8. A method of preventing a weight loss by heating of a resin composition, comprising adding 0.1 to 5 parts by weight based on 100 parts by weight of the total of component A and component B of (C) at least one compound (component C) selected from the group consisting of a polyester having a sulfonate group (component C-1) and a polyether ester having a sulfonate group (component C-2) to the resin composition comprising (A) 65 to 85 parts by weight of an aromatic polycarbonate resin (component A) and (B) 15 to 35 parts by weight of graphite having an average particle diameter of 5 to 60 μm (component B).

BRIEF DESCRIPTION OF THE DRAWINGS

FIG. 1 is a schematic diagram of an air rectifier plate used in Examples.

EXPLANATION OF REFERENCE NUMERALS 1 length of air rectifier plate (35 mm)
2 width of air rectifier plate (15 mm)
3 thickness of air rectifier plate (2 mm)

BEST MODE FOR CARRYING OUT THE INVENTION

The present invention will be described in detail hereinunder.
(Component A: Aromatic Polycarbonate Resin)

The aromatic polycarbonate resin (component A) is obtained by reacting a dihydric phenol with a carbonate precursor. Examples of the reaction include interfacial polymerization, melt transesterification, the solid-phase transesterification of a carbonate prepolymer and the ring-opening polymerization of a cyclic carbonate compound.

Typical examples of the dihydric phenol used herein include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. Out of these, bis(4-hydroxyphenyl)alkanes are preferred dihydric phenols, and bisphenol A is particularly preferred from the viewpoint of impact resistance and is widely used.

As the carbonate precursor is used a carbonyl halide, a diester carbonate or a haloformate. Specific examples thereof include phosgene, diphenyl carbonate and dihaloformates of a dihydric phenol.

For the manufacture of the aromatic polycarbonate resin from a dihydric phenol and a carbonate precursor by interfacial polymerization, a catalyst, a terminal capping agent and an antioxidant for preventing the oxidation of the dihydric phenol may be optionally used. The aromatic polycarbonate resin includes a branched polycarbonate resin obtained by copolymerizing a polyfunctional aromatic compound having 3 or more functional groups, a polyester carbonate resin obtained by copolymerizing an aromatic or aliphatic (including alicyclic) bifunctional carboxylic acid, a copolycarbonate resin obtained by copolymerizing a bifunctional alcohol (including an alicyclic bifunctional alcohol), and a polyester carbonate resin obtained by copolymerizing the bifunctional carboxylic acid and the bifunctional alcohol. It may also be a mixture of two or more of the obtained aromatic polycarbonate resins.

The branched polycarbonate resin can provide dripping prevention performance to the resin composition of the present invention. Examples of the polyfunctional aromatic compound having 3 or more functional groups used in the branched polycarbonate resin include phloroglucin, phloroglucide, trisphenols such as 4,6-dimethyl-2,4,6-tris(4-hydroxyphenyl)heptene-2, 2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides thereof. Out of these, 1,1,1-tris(4-hydroxyphenyl)ethane and 1,1,1-tris(3,5-dimethyl-4-hydroxyphenyl)ethane are preferred, and 1,1,1,-tris(4-hydroxyphenyl)ethane is particularly preferred.

The amount of the constituent unit derived from the polyfunctional aromatic compound in the branched polycarbonate is preferably 0.01 to 1 mol %, more preferably 0.05 to 0.9 mol %, particularly preferably 0.05 to 0.8 mol % based on 100 mol % of the total of the constituent unit derived from the dihydric phenol and the constituent unit derived from the polyfunctional aromatic compound.

Although a branched structural unit may be produced as a side reaction in the case of melt transesterification, the amount of the branched structural unit is preferably 0.001 to 1 mol %, more preferably 0.005 to 0.9 mol %, particularly preferably 0.01 to 0.8 mol % based on 100 mol % of the total of the branched structural unit and the constituent unit derived from the dihydric phenol. The content of the branched structure can be calculated by $^1$H-NMR measurement.

The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. The bifunctional alcohol is preferably an alicyclic diol such as cyclohexanedimethanol, cyclohexanediol or tricyclodecanedimethanol.

A polycarbonate-polydiorganosiloxane copolymer comprising a polycarbonate block represented by the following formula [2] and a polydiorganosiloxane block represented by the following formula [4] may also be used.

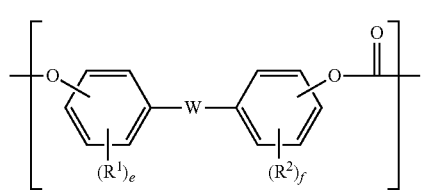

[2]

(In the above general formula (2), $R^1$ and $R^2$ are each independently a group selected from the group consisting of hydrogen atom, halogen atom, alkyl group having 1 to 18 carbon atoms, alkoxy group having 1 to 18 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 3 to 14 carbon atoms, aralkyl group having 7 to 20 carbon atoms, aralkyloxy group having 7 to 20 carbon atoms, nitro group, aldehyde group, cyano group and carboxyl group. When there are $R^1$'s and $R^2$'s, they may be the same or different. "e" and "f" are each independently an integer of 1 to 4, and "W" is a single bond or at least one group selected from groups represented by the following general formulas [3].)

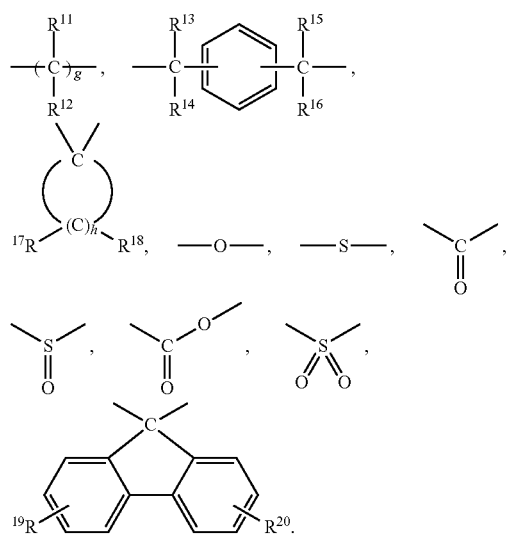

[3]

(In the above general formulas [3], $R^{11}$, $R^{12}$, $R^{13}$, $R^{14}$, $R^{15}$, $R^{16}$, $R^{17}$ and $R^{18}$ are each independently a group selected from the group consisting of hydrogen atom, alkyl group having 1 to 18 carbon atoms, aryl group having 3 to 14 carbon atoms and aralkyl group having 7 to 20 carbon atoms. $R^{19}$ and $R^{20}$ are each independently a group selected from the group consisting of hydrogen atom, halogen atom, alkyl group having 1 to 18 carbon atoms, alkoxy group having 1 to 10 carbon atoms, cycloalkyl group having 6 to 20 carbon atoms, cycloalkoxy group having 6 to 20 carbon atoms, alkenyl group having 2 to 10 carbon atoms, aryl group having 3 to 14 carbon atoms, aryloxy group having 6 to 10 carbon atoms, aralkyl group having 7 to 20 carbon atoms, aralkyloxy group having 7 to 20 carbon atoms, nitro group, aldehyde group, cyano group and carboxyl group. When there are $R^{19}$'s and $R^{20}$'s, they may be the same or different, "g" is an integer of 1 to 10, and "h" is an integer of 4 to 7.)]

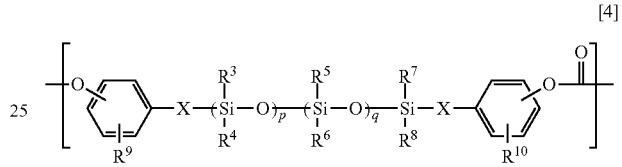

[4]

(In the above general formula [4], $R^3$, $R^4$, $R^5$, $R^6$, $R^7$ and $R^8$ are each independently a hydrogen atom, alkyl group having 1 to 12 carbon atoms or substituted or nonsubstituted aryl group having 6 to 12 carbon atoms. $R^9$ and $R^{10}$ are each independently a hydrogen atom, halogen atom, alkyl group having 1 to 10 carbon atoms or alkoxy group having 1 to 10 carbon atoms. "p" is a natural number, "q" is 0 or a natural number, and (p+g)(polymerization degree of diorganosiloxane) is a natural number of less than 300. "X" is a divalent aliphatic group having 2 to 8 carbon atoms.)

The polycarbonate-polydiorganosiloxane copolymer is obtained by reacting a dihydric phenol with a carbonate precursor. The dihydric phenol used in the process of producing the polycarbonate-polydiorganosiloxane copolymer is represented by the following general formula [5].

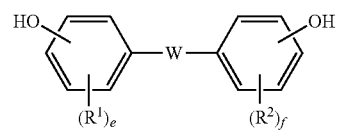

[5]

(In the above formula, $R^1$, $R^2$, "e", "f" and "W" are as defined above.)

Examples of the dihydric phenol represented by the above general formula [5] include 4,4'-dihydroxybiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl) propane, 1,1-bis(4-hydroxyphenyl)-3,3,5-trimethylcyclohexane, 2,2-bis(4-hydroxy-3,3'-biphenyl)propane, 2,2-bis (4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl)diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxydiphenyl ether, 4,4'-dihydroxy-3,3'-dimethyldiphenyl ether, 4,4'-sulfonyl diphenol, 4,4'-dihydroxydiphenyl sulfoxide, 4,4'-dihydroxydiphenyl sulfide, 2,2'-dimethyl-4,4'-sulfonyl diphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanedyl)diphenol and 1,3-bis(4-hydroxyphenyl)-5,7-dimethyladamantane.

Out of these, 1,1-bis(4-hydroxyphenyl)-1-phenylethane, 2,2-bis(4-hydroxyphenyl)propane, 2,2-bis(4-hydroxy-3-methylphenyl)propane, 1,1-bis(4-hydroxyphenyl)cyclohexane, 1,1-bis(4-hydroxyphenyl)-3,3,5-trimethylcyclohexane, 4,4'-sulfonyldiphenol, 2,2'-dimethyl-4,4'-sulfonyl diphenol, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene are preferred. 2,2-bis(4-hydroxyphenyl)propane, 1,1-bis(4-hydroxyphenyl)cyclohexane (BPZ), 4,4'-sulfonyldiphenol and 9,9-bis(4-hydroxy-3-methylphenyl)fluorene are particularly preferred. 2,2-bis(4-hydroxyphenyl)propane having high strength and high durability is most preferred. They may be used alone or in combination of two or more.

The carbonate precursor used in the process of producing the polycarbonate-polydiorganosiloxane copolymer is a hydroxyaryl-terminated polydiorganosiloxane represented by the following general formula [6].

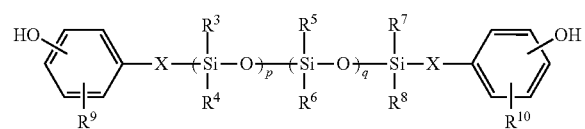

[6]

(In the above formula, $R^3$, $R^4$, $R^5$, $R^6$, $R^7$, $R^8$, $R^9$, $R^{10}$, "p", "q" and "X" are as defined above.)

(p+q) (polymerization degree of diorganosiloxane) is preferably 2 to 290, more preferably 5 to 100. Above the lower limit of the above preferred range, impact resistance and flame retardancy become excellent, and below the upper limit of the preferred range, the surface appearance of a molded article becomes excellent. A copolymer having a diorganosiloxane polymerization degree above the lower limit has a great effect of modifying rheology characteristics due to the introduction of a polydiorganosiloxane moeity having low cohesive force, thereby making it easy to increase the structural viscosity index. As a result, a resin molded article which is suppressed in dripping at the time of combustion while retaining high flowability at the time of shear flow and has high flame retardancy can be obtained. A copolymer having a diorganosiloxane polymerization degree below the upper limit tends to reduce the average size and normalized dispersity of a polydiorganosiloxane domain. As a result, a resin molded article having an excellent surface appearance can be obtained. The number of moles based on unit weight of a polydiorganosiloxane unit which has a polymerization degree below the above upper limit increases, whereby the unit is easily uniformly incorporated into the polycarbonate. When the diorganosiloxane polymerization degree is high, the incorporation of the polydiorganosiloxane unit into the polycarbonate becomes nonuniform and the content of the polydiorganosiloxane unit in the polymer molecule increases. Therefore, a polycarbonate containing the unit and a polycarbonate containing none of the unit are readily formed, and compatibility between them tends to degrade. As a result, a large polydiorganosiloxane domain is readily formed. Meanwhile, since it is advantageous that the polydiorganosiloxane domain should be large to some extent from the viewpoints of impact resistance and flame retardancy, the above preferred range of polymerization degree exists.

The following compounds are preferably used as this hydroxyaryl-terminated polydiorganosiloxane.

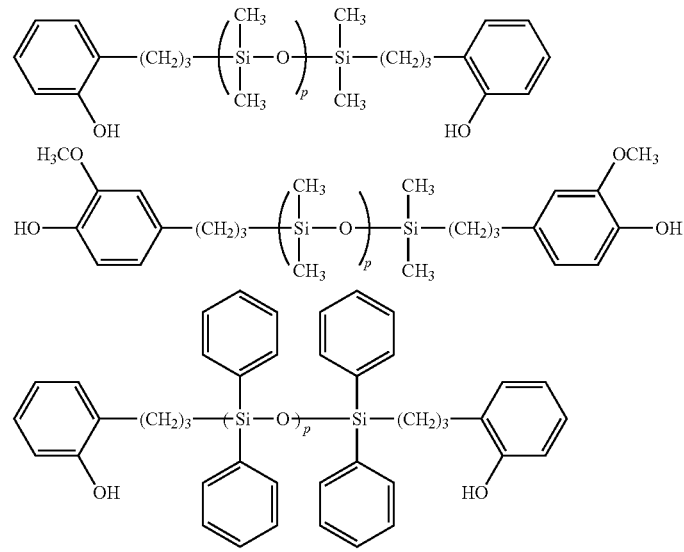

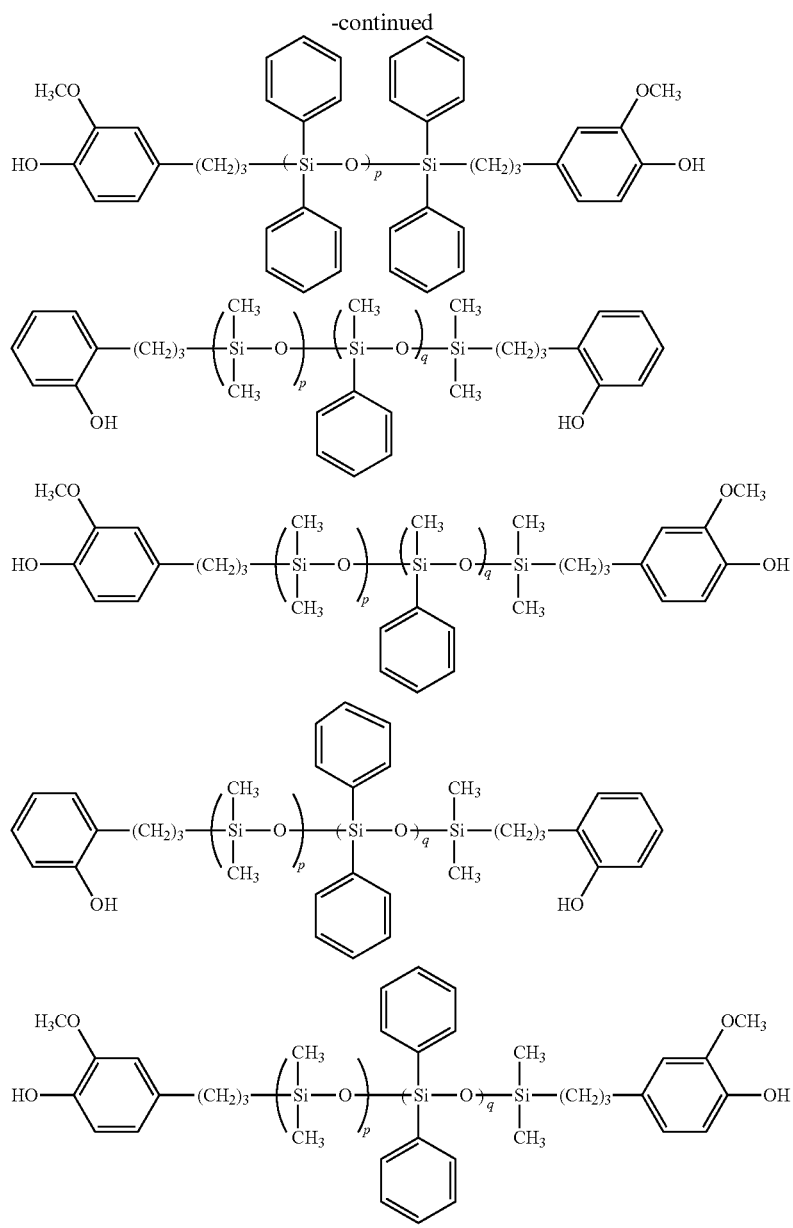

(In the above formulas, "p" and "q" are as defined above.)

The hydroxylaryl-terminated polydiorganosiloxane is easily produced by hydrosilylation reacting a phenol having an olefinically unsaturated carbon-carbon bond, preferably vinyl phenol, 2-allylphenol, isopropenyl phenol or 2-methoxy-4-allylphenol with a terminal of a polysiloxane chain having a predetermined degree of polymerization. (2-allyphenol)-terminated polydiorganosiloxanes and (2-methoxy-4-allylphenol)-terminated polydiorganosiloxanes are preferred, and (2-allylphenol)-terminated polydimethylsiloxane and (2-methoxy-4-allyphenol)-terminated polydimethylsiloxane are particularly preferred.

The amount of the polydiorganosiloxane is preferably 0.1 to 50 wt %, more preferably 0.1 to 10 wt %, much more preferably 0.5 to 8 wt %, particularly preferably 1 to 5 wt % based on the total weight of the copolymer. Above the lower limit of the preferred range, excellent impact resistance and flame retardancy are obtained and below the upper limit of the preferred range, stable transparency which is hardly affected by molding conditions is readily obtained. The polymerization degree of the diorganosiloxane and the content of the polydiorganosiloxane can be calculated by $^1$H-NMR measurement.

The hydroxyaryl-terminated polydiorganosiloxanes may be used alone or in combination of two or more in the production process of the above copolymer.

As long as the above production process is not impeded, another comonomer except for the above dihydric phenols and the hydroxyaryl-terminated polydiorganosiloxanes may be used in an amount of not more than 10 wt % based on the total weight of the copolymer.

In the above production process, a mixed solution of a chloroformate of a dihydric phenol and/or a chloroformate compound containing a carbonate oligomer of a dihydric phenol having a terminal chloroformate group is prepared through a reaction between the dihydric phenol and a chloroformate forming compound such as phosgene or the chloroformate of a dihydric phenol in a mixed solution of a water-insoluble organic solvent and an alkaline aqueous solution. Phosgene is preferred as the chloroformate forming compound.

To form the chloroformate compound from the dihydric phenol, the whole amount of the dihydric phenol may be used at a time to form the chloroformate compound, or part of the dihydric phenol may be added as a post-addition monomer to the subsequent interfacial polycondensation reaction as a reaction raw material. The post-addition monomer is added to accelerate the subsequent polycondensation reaction and does not need to be added when not necessary.

This chloroformate compound forming reaction method is not particularly limited but preferably carried out in a solvent in the presence of an acid binder. Further, a small amount of an antioxidant such as sodium sulfite or hydrosulfide may be added as required and is preferably added.

The amount of the chloroformate forming compound may be suitably adjusted in consideration of the stoichiometric proportion (equivalent) of the reaction. When phosgene which is a preferred chloroformate forming compound is used, gasified phosgene is preferably blown into the reaction system.

As the above acid binder may be used an alkali metal hydroxide such as sodium hydroxide or potassium hydroxide, an alkali metal carbonate such as sodium carbonate or potassium carbonate, an organic base such as pyridine, or a mixture thereof.

The amount of the acid binder may also be suitably determined in consideration of the stoichiometric proportion (equivalent) of the reaction like above. More specifically, 2 equivalents or a little more than this of the acid binder is preferably used based on 1 mole (generally, 1 mole is equivalent to 2 equivalents) of the dihydric phenol used to form the chloroformate compound of the dihydric phenol.

As the above solvent, various solvents which are inactive to the reaction and used to produce known polycarbonates may be used alone or as a mixture. Typical examples thereof include hydrocarbon solvents such as xylene and halogenated hydrocarbon solvents such as methylene chloride and chlorobenzene. Halogenated hydrocarbon solvents such as methylene chloride are preferably used.

The pressure during the chloroformate compound forming reaction is not particularly limited and may be normal, increased or reduced pressure. In general, it is advantageous that the reaction should be carried out under normal pressure. The reaction temperature is selected from a range from −20° C. to 50° C. Since heat is generated by the reaction in many cases, water cooling or ice cooling is desirably carried out. The reaction time is affected by other conditions and cannot be specified unconditionally but generally 0.2 to 10 hours.

As for the pH range during the chloroformate compound forming reaction, a known interfacial reaction condition may be used, and pH is generally adjusted to not less than 10.

In the present invention, after the mixed solution of a chloroformate of a dihydric phenol and a chloroformate compound containing a carbonate oligomer of a dihydric phenol having a terminal chloroformate group is prepared, a hydroxyaryl-terminated polydiorganosiloxane represented by the following formula [6] is added at a rate of not more than 0.01 mole/min based on 1 mole of the dihydric phenol charged to prepare the mixed solution while the mixed solution is stirred to carryout the interfacial polycondensation of the hydroxyaryl-terminated polydiorganosiloxane and the chloroformate compound so as to obtain a polycarbonate-polydiorganosiloxane copolymer.

To carry out the interfacial polycondensation reaction, an acid binder may be suitably added in consideration of the stoichiometric proportion (equivalent) of the reaction. As the acid binder may be used an alkali metal hydroxide such as sodium hydroxide or potassium hydroxide, an alkali metal carbonate such as sodium carbonate or potassium carbonate, an organic base such as pyridine, or a mixture thereof. More specifically, when the hydroxyaryl-terminated polydiorganosiloxane or part of the dihydric phenol as a post-addition monomer is added in this reaction stage as described above, an alkali is preferably used in an amount of 2 equivalents or more based on the total number of moles of the dihydric phenol as the post-addition monomer and the hydroxyaryl-terminated polydiorganosiloxane (generally, 1 mole is equivalent to 2 equivalents).

The interfacial polycondensation reaction between the dihydric phenol oligomer and the hydroxyaryl-terminated polydiorganosiloxane is carried out by violently stirring the above mixed solution.

In the polycondensation reaction, a terminal capping agent or a molecular weight control agent is generally used. The terminal capping agent is a compound having a monovalent phenolic hydroxyl group, as exemplified by ordinary phenol, p-tert-butylphenol, p-cumylphenol, tribromophenol, long-chain alkyl phenols, aliphatic carboxylic acid chlorides, aliphatic carboxylic acids, hydroxy benzoic acid alkyl esters, hydroxyphenyl alkyl acid esters and alkyl ether phenols. The amount of the terminal capping agent is preferably 100 to 0.5 mole, more preferably 50 to 2 moles based on 100 moles of the total of all the dihydric phenol compounds in use. Two or more compounds may be used in combination as a matter of course.

To promote the polycondensation reaction, a catalyst such as a tertiary amine exemplified by triethylamine and a quaternary ammonium salt may be added and is preferably added. Triethylamine is particularly preferably used.

The polymerization reaction time must be relatively prolonged to improve transparency. It is preferably 30 minutes or longer, more preferably 50 minutes or longer. The upper limit of the time is preferably 2 hours, more preferably 1.5 hours from the viewpoint of production efficiency.

The interfacial polymerization reaction is generally a reaction between a dihydric phenol and phosgene in the presence of an acid binder and an organic solvent. As the acid binder may be used an alkali metal hydroxide such as sodium hydroxide or potassium hydroxide, or pyridine.

As the organic solvent may be used a halogenated hydrocarbon such as methylene chloride or chlorobenzene.

A catalyst such as a tertiary amine or a quaternary ammonium salt may be used to promote the reaction. A monofunctional phenol such as phenol, p-tert-butylphenol or p-cumylphenol is preferably used as a molecular weight control agent. Further, monofunctional phenols such as decylphenol, dodecylphenol, tetradecylphenol, hexadecylphenol, octadecylphenol, eicosylphenol, docosylphenol and triacontylphenol may also be used. The use of the above monofunctional phenol having a relatively long-chain alkyl group is effective when the improvement of flowability and hydrolysis resistance is desired.

The reaction temperature is generally 0 to 40° C., the reaction time is several minutes to 5 hours, and pH during the reaction is preferably maintained at 10 or more.

The melt transesterification reaction is generally a transesterification reaction between a dihydric phenol and a diester carbonate. The dihydric phenol and the diester carbonate are mixed together in the presence of an inert gas and reacted with each other at 120 to 350° C. under reduced pressure. The degree of pressure reduction is changed stepwise, and the formed phenols are removed to the outside of the system by reducing the pressure to 133 Pa or less finally. The reaction time is generally about 1 to 4 hours.

Examples of the diester carbonate include diphenyl carbonate, dinaphthyl carbonate, bis(diphenyl)carbonate, dimethyl carbonate, diethyl carbonate and dibutyl carbonate, out of which diphenyl carbonate is preferred.

A polymerization catalyst may be used to accelerate the polymerization rate. Examples of the polymerization catalyst include alkali metal and alkali earth metal hydroxides such as sodium hydroxide and potassium hydroxide, boron and aluminum hydroxides, alkali metal salts, alkali earth metal salts, quaternary ammonium salts, alkoxides of an alkali metal or an alkali earth metal, organic acid salts of an alkali metal or an alkali earth metal, zinc compounds, boron compounds, silicon compounds, germanium compounds, organic tin compounds, lead compounds, antimony compounds, manganese compounds, titanium compounds and zirconium compounds, all of which are generally used for an esterification reaction and a transesterification reaction. These catalysts may be used alone or in combination of two or more. The amount of the polymerization catalyst is preferably $1 \times 10^{-9}$ to $1 \times 10^{-5}$ equivalent, more preferably $1 \times 10^{-8}$ to $5 \times 10^{-6}$ equivalent based on 1 mole of the dihydric phenol as a raw material.

In order to reduce the amount of the phenolic terminal group in the polymerization reaction, a compound such as 2-chlorophenylphenyl carbonate, 2-methoxycarbonylphenylphenyl carbonate or 2-ethoxycarbonylphenylphenyl carbonate may be added in the latter stage or at the end of the polycondensation reaction.

Further, a deactivator is preferably used to neutralize the activity of the catalyst in the melt transesterification process. The amount of the deactivator is preferably 0.5 to 50 moles based on 1 mole of the residual catalyst. Further, it is preferably 0.01 to 500 ppm, more preferably 0.01 to 300 ppm, particularly preferably 0.01 to 100 ppm based on the aromatic polycarbonate resin after polymerization. Examples of the deactivator include phosphonium salts such as tetrabutylphosphonium decylbenzenesulfonates, and ammonium salts such as tetraethylammonium dodecylbenzyl sulfate.

Other reaction patterns except for the above are well known through documents and patent publications.

The viscosity average molecular weight (M) of the aromatic polycarbonate resin (component A) is not particularly limited but preferably 10,000 to 50,000, more preferably 14,000 to 30,000, much more preferably 14,000 to 24,000.

Satisfactory mechanical properties are not obtained from an aromatic polycarbonate resin having a viscosity average molecular weight lower than 10,000. A resin composition obtained from an aromatic polycarbonate resin having a viscosity average molecular weight higher than 50,000 is inferior in general versatility as it has low flowability at the time of injection molding.

The aromatic polycarbonate resin (component A) may be obtained by mixing an aromatic polycarbonate resin having a viscosity average molecular weight outside the above range. Particularly an aromatic polycarbonate resin having a viscosity average molecular weight higher than the above range (50,000) improves the entropy elasticity of a resin. As a result, it exhibits high moldability in gas assist molding which is used to mold a reinforced resin material into a structural member and foam molding. It improves moldability better than the above branched polycarbonate. As a more preferred example, an aromatic polycarbonate resin (component A-1) (may be referred to as "high-molecular weight component-containing aromatic polycarbonate resin" hereinafter) having a viscosity average molecular weight of 16,000 to 35,000 and consisting of an aromatic polycarbonate resin having a viscosity average molecular weight of 70,000 to 300,000 (component A-1-1) and an aromatic polycarbonate resin having a viscosity average molecular weight of 10,000 to 30,000 (component A-1-2) may also be used as the component A.

In the above high-molecular weight component-containing aromatic polycarbonate resin (component A-1), the viscosity average molecular weight of the component A-1-1 is preferably 70,000 to 200,000, more preferably 80,000 to 200,000, much more preferably 100,000 to 200,000, particularly preferably 100,000 to 160,000. The viscosity average molecular weight of the component A-1-2 is preferably 10,000 to 25,000, more preferably 11,000 to 24,000, much more preferably 12,000 to 24,000, particularly preferably 12,000 to 23,000.

The high-molecular weight component-containing aromatic polycarbonate resin (component A-1) can be obtained by mixing together the above components A-1-1 and A-1-2 in a ratio to achieve the predetermined viscosity average molecular weight range. The amount of the component A-1-1 is preferably 2 to 40 wt %, more preferably 3 to 30 wt %, much more preferably 4 to 20 wt %, particularly preferably 5 to 20 wt % based on 100 wt % of the component A-1.

To prepare the component A-1, (1) a method in which the component A-1-1 and the component A-1-2 are polymerized independently and mixed together, (2) a method in which an aromatic polycarbonate resin showing a plurality of polymer peaks in a molecular weight distribution chart measured by GPC is produced in the same system as typified by the method disclosed by JP-A 5-306336 to ensure that the aromatic polycarbonate resin satisfies the conditions of the component A-1 of the present invention, and (3) a method in which the aromatic polycarbonate resin obtained by the above production method (2) is mixed with the component A-1-1 and/or the component A-1-2 produced separately may be employed.

The term "viscosity average molecular weight" as used herein is obtained as follows. The specific viscosity ($\eta_{sp}$) to be calculated by the following equation is first obtained from a solution prepared by dissolving 0.7 g of an aromatic polycarbonate in 100 ml of methylene chloride at 20° C. by using an Ostwald's viscometer, and the viscosity average molecular weight M is calculated from the obtained specific viscosity ($\eta_{sp}$) based on the following equation.

Specific viscosity $(\eta_{sp}) = (t - t_0)/t_0$

[$t_0$ is the number of seconds during which methylene chloride drops and t is the number of seconds during which a sample solution drops]

$\eta_{sp}/c = [\eta] + 0.45 \times [\eta]^2 c$ ([$\eta$] is an intrinsic viscosity)

$[\eta] = 1.23 \times 10^{-4} M^{0.83}$ c=0.7

To calculate the viscosity average molecular weight of the aromatic polycarbonate resin (component A) in the resin composition of the present invention, the following procedure is taken. That is, the resin composition is mixed with methylene chloride in a weight ratio of 1:20 to 1:30 to dissolve soluble matter contained in the resin composition. The soluble matter is collected by cerite filtration. Thereafter, the solvent contained in the obtained solution is removed. The solid after the removal of the solvent is dried completely so as to obtain a methylene chloride-soluble solid. 0.7 g of the solid is dissolved in 100 ml of methylene chloride to measure the specific viscosity of the obtained solution at 20° C. in the same manner as above so as to calculate the viscosity average molecular weight M from the above specific viscosity in the same manner as above.

(Component B: Graphite)

Natural graphite which is called "black lead" minerallogically or artificial graphite may be used as graphite (component B). Examples of the natural graphite include earthy graphite, vein graphite (also called "block graphite") and flake graphite. The artificial graphite is obtained by heating amorphous carbon and artificially aligning irregular graphite fine crystals. Besides artificial graphites which are generally used as carbon materials, kish graphite, decomposed graphite and thermally decomposed graphite are also included. The artificial graphites which are generally used as carbon materials are manufactured by graphitizing petroleum coke and coal pitch coke as the main raw material.

Out of these, the preferred graphite of the present invention is flake graphite. A resin composition comprising this flake graphite has excellent electrical conductivity and stiffness and high flame retardancy due to high heat stability. When heat stability is unsatisfactory, the decomposition of the resin becomes marked at the time of combustion, thereby hardly obtaining high flame retardancy. The amount of the flake graphite is preferably not less than 80 wt %, more preferably not less than 90 wt % based on 100 wt % of the component B and particularly preferably substantially the whole of the component B.

The graphite (component B) may contain thermally expandable graphite which is obtained by subjecting flake graphite to a treatment typified by an acid treatment or expanded graphite. Since the expandable graphite may be unsatisfactory in terms of heat stability and the expanded graphite often does not obtain satisfactory flame retardancy, the amount of the expandable graphite or the expanded graphite is preferably not more than 20 wt %, more preferably not more than 10 wt % based on 100 wt % of the component B.

The average particle diameter of the graphite (component B) is in the range of 5 to 60 µm, preferably 5 to 50 µm, more preferably 7 to 40 µm, much more preferably 7 to 35 µm. Within the above range, the resin composition achieves high stiffness and high electrical conductivity. When the average particle diameter is smaller than 5 µm, the effect of improving dimensional accuracy may deteriorate and when the average particle diameter is larger than 60 µm, impact resistance slightly degrades and so-called "floating graphite" on the surface of a molded article becomes noticeable disadvantageously. Floating on the surface is due to the fall-off of graphite from the surface of the molded article which may damage a part through conduction with an electronic part. The above preferred average particle diameter has advantages that the appearance of the molded article becomes good and high slidability is easily obtained.

The average particle diameter of the graphite (component B) is the particle diameter of the component B itself before it is contained in the composition and the average value of particle diameters obtained by taking a scanning electron photomicrograph of the graphite and selecting images of 40 to 50 particles at random from this photomicrograph.

The graphite (component B) is graphite having an average ratio of the length in the longitudinal direction to the thickness of preferably not less than 30, more preferably not less than 60. By using graphite having an average ratio of the length in the longitudinal direction to the thickness of not less than 30, high stiffness is achieved and high electrical conductivity is obtained. When the average ratio of the length in the longitudinal direction to the thickness is less than 30, the effect of improving electrical conductivity tends to deteriorate disadvantageously. The average ratio of the length in the longitudinal direction to the thickness is the average ratio of the length in the longitudinal direction to the thickness of graphite particles.

The average ratio of the length in the longitudinal direction to the thickness of the graphite (component B) is a value obtained by placing the graphite on a sample stage, taking a scanning electron photomicrograph of the graphite, selecting images of 40 to 50 particles at random from this photomicrograph, obtaining the ratios of the lengths in the longitudinal direction to the thicknesses of the particles and averaging the obtained ratios.

The average thickness of the particles of the graphite (component B) is preferably 0.1 to 10 µm, more preferably 0.1 to 1 µm.

The average thickness of particles of the graphite (component B) is obtained by placing the graphite on the sample stage, taking a scanning electron photomicrograph of the graphite, selecting images of 40 to 50 particles at random from this photomicrograph to obtain the thickness of each particle and averaging the obtained values.

The fixed carbon content of the graphite (component B) is preferably not less than 95%, more preferably not less than 97%, particularly preferably not less than 99%. By using graphite having a fixed carbon content of not less than 95%, a resin molded article having a thickness of 1.6 mm obtained from the resin composition of the present invention attains V-1 or V-0 flammability rating in a UL-94 combustion test advantageously. When the fixed carbon content is lower than 95%, the flame retardancy of the resin composition of the present invention degrades disadvantageously.

The surface of the graphite may be subjected to a surface treatment such as epoxy treatment, urethane treatment, silane coupling treatment or oxidation in order to increase its affinity for a thermoplastic resin as long as the characteristic properties of the resin composition of the present invention are not impaired.

The content of the graphite (component B) is 15 to 35 parts by weight, preferably 20 to 35 parts by weight, more preferably 25 to 35 parts by weight based on 100 parts by weight of the total of the components A and B. When the content of the graphite is lower than 15 parts by weight, high electrical conductivity and stiffness are hardly obtained and when the content is higher than 35 parts by weight, outgas reduction property and melt heat stability degrade.

(Component C: Polyester Having a Sulfonate Group and/or Polyether Ester Having a Sulfonate Group)

When the resin composition of the present invention comprises at least one compound (component C) selected from the group consisting of a polyester having a sulfonate group (component C-1) and a polyether ester having a sulfonate group (component C-2), it exhibits excellent characteristic properties. Preferably, the resin composition of the present invention comprises both of them.

The polyether ester is a polymer having a poly (alkylene oxide)glycol component which is a tri or more-mer as a recurring unit. The polyester is a polymer having no poly (alkylene oxide)glycol component which is a tri or more-mer. The polyester may contain a diethylene glycol component. The component C can be manufactured as a polymer compound by carrying out the polymerization reaction of a monomer substituted by a sulfonate group or by modifying a polymer not substituted by a sulfonate group with a sulfonate group. Examples of the sulfonate group ($-SO_3^- M^+$) contained in the component C are given below. Examples of the metal ion as $M^+$ (may be simply referred to as "counter ion" hereinafter) include alkali metal ions such as sodium, potassium, lithium, rubidium and cesium ions, alkali earth metal ions such as calcium and magnesium ions, zinc ion and copper ion. Examples of the organic onium ion as the counter ion include ammonium ion, phosphonium ion, sulfonium ion and onium ion derived from a hetero aromatic ring. Primary, secondary, tertiary and quaternary organic onium ions may be used as the organic onium ion but a quaternary onium ion is preferred. The organic onium ion as the counter ion is more preferably an organic phosphonium ion (such as tetrabutyl phosphonium ion or tetramethyl phosphonium ion) or an organic ammonium ion (such as tetrabutylammonium ion or tetramethylammonium ion), particularly preferably an organic phosphonium ion. The counter ion in the sulfonate group contained in the component C is preferably a metal ion, more preferably an alkali metal ion, alkali earth metal ion or zinc ion, particularly preferably an alkali metal ion. In the case of a divalent metal ion, 1 mole of the metal ion corresponds to 2 moles of the sulfonate group.

The component C is a polymer containing preferably at least two, more preferably at least three, much more preferably at least four sulfonate groups in one molecule. The number average molecular weight of the component C is preferably not less than 1,000, more preferably not less than 2,000. The content of the sulfonate group in the component C is preferably $5\times10^{-7}$ to $5\times10^{-2}$ mole/g, more preferably $5\times10^{-6}$ to $5\times10^{-3}$ mole/g.

(Polyester: Component C-1)

The polyester (component C-1) is preferably a polyester which comprises (C1-1) a recurring unit derived from an aromatic dicarboxylic acid component having no sulfonate group, (C1-2) a recurring unit derived from an aromatic dicarboxylic acid component substituted by a sulfonate group and represented by the following general formula [1], and (C1-3) a recurring unit derived from a glycol component having 2 to 10 carbon atoms.

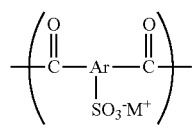

[1]

(In the above formula, Ar is a trivalent aromatic group having 6 to 20 carbon atoms, and $M^+$ is a metal ion or organic onium ion.)

Examples of the aromatic dicarboxylic acid having no sulfonate group for inducing C1-1 and ester forming derivatives thereof include terephthalic acid, isophthalic acid, naphthalenedicarboxylic acid, biphenyldicarboxylic acid and ester forming derivatives thereof. Out of these, terephthalic acid, isophthalic acid, naphthalenedicarboxylic acid, biphenyldicarboxylic acid and ester forming derivatives thereof are preferred. Examples of the naphthalenedicarboxylic acid and ester forming derivatives thereof include 2,6-naphthalenedicarboxylic acid, 2,7-naphthalenedicarboxylic acid, dimethyl 2,6-naphthalenedicarboxylate, diethyl 2,6-naphthalenedicarboxylate, dimethyl 2,7-naphthalenedicarboxylate and diethyl 2,7-naphthaienedicarboxylate. The hydrogen atom of the aromatic ring of each of these compounds may be substituted by an alkyl group or a halogen atom. The above aromatic dicarboxylic acid components having no sulfonate group for inducing C1-1 may be contained alone or in combination of two or more in the polyester.

The recurring unit derived from the aromatic dicarboxylic acid component substituted by a sulfonate group as C1-2 is represented by the above formula [1].

Ar in the above formula [1] is a trivalent aromatic group having 6 to 20 carbon atoms, as exemplified by trivalent benzene ring and naphthalene ring. These rings may have a substituent such as alkyl group, phenyl group, halogen or alkoxy group. Examples of the aromatic dicarboxylic acid substituted by a sulfonate group for inducing C1-2 and ester forming derivatives thereof include 4-sodium sulfo-isophthalic acid, 5-sodium sulfo-isophthalic acid, 4-potassium sulfo-isophthalic acid, 5-potassium sulfo-isophthalic acid, 2-sodium sulfo-terephthalic acid, 2-potassium sulfo-terephthalic acid, zinc 4-sulfo-isophthalates, zinc 5-sulfo-isophthalates, zinc 2-sulfo-terephthalates, tetraalkylphosphonium 4-sulfo-isophthalates, tetraalkylphosphonium 5-sulfo-isophthalates, tetraalkylammonium 4-sulfo-isophthalates, tetraalkylammonium 5-sulfo-isophthalates, tetraalkylphosphonium 2-sulfo-terephthalates, tetraalkylammonium 2-sulfo-terephthalates, 4-sodium sulfo-2,6-naphthalenedicarboxylic acid, 4-sodium sulfo-2,7-naphthalenedicarboxylic acid, 4-potassium sulfo-2,6-naphthalenedicarboxylic acid, 4-potassium sulfo-2,7-naphthalenedicarboxylic acid, zinc 4-sulfo-2,6-naphthalenedicarboxylates, zinc 4-sulfo-2,7-naphthalenedicarboxylates, tetraalkylammonium 4-sulfo-2,6-naphthalenedicarboxylates, tetraalkylammonium 4-sulfo-2,7-naphthalenedicarboxylates, tetraalkylphosphonium 4-sulfo-2,6-naphthalenedicarboxylates, tetraalkylphosphonium 4-sulfo-2,7-naphthalenedicarboxylates, and dimethyl esters and diethyl esters thereof.

Out of these, dimethyl esters or diethyl esters of an aromatic dicarboxylic acid in which Ar is a benzene ring and $M^+$ is an alkali metal ion such as sodium or potassium ion are preferred from the viewpoints of polymerizability, antistatic properties, mechanical properties and color. Specific examples thereof include dimethyl 4-sodium sulfo-isophthalate, dimethyl 5-sodium sulfo-isophthalate, dimethyl 4-potassium sulfo-isophthalate, dimethyl 5-potassium sulfo-isophthalate, dimethyl 2-sodium sulfo-terephthalate and dimethyl 2-potassium sulfo-terephthalate. The above aromatic dicarboxylic acid components substituted by a sulfonate group for inducing C1-2 may be contained alone or in combination of two or more in the polyester.

As for the two acid components C1-1 and C1-2 constituting the polyester as the component C-1, preferably, the amount of the recurring unit derived from the aromatic dicarboxylic acid component having no sulfonate group (C1-1) is 99.9 to 50 mol % and the amount of the recurring unit derived from the aromatic dicarboxylic acid component substituted by a sulfonate group and represented by the above formula [1] (C1-2) is 0.1 to 50.0 mol % based on 100 mol % of the total of all the acid components. When the amount of the component C1-2 is smaller than 0.1 mol %, electrical conductivity may become unsatisfactory. When the amount of the component C1-2 is larger than 50.0 mol %, the polymerization reaction becomes difficult. As for the more preferred ratio of the component C1-1 to the component C1-2, the amount of the component C1-1 is 60.0 to 90.0 mol % and the amount of the component C1-2 is 10.0 to 40.0 mol %. Much more preferably, the amount of the component C1-1 is 70.0 to 90.0 mol % and the amount of the component C1-2 is 10.0 to 30.0 mol %.

Examples of the glycol having 2 to 10 carbon atoms for inducing C1-3 include ethylene glycol, 1,4-butanediol, propylene glycol, 1,6-hexanediol and 3-methyl-1,5-pentanediol. The glycol may contain an ether bond like diethylene glycol or a thioether bond like thiodiethanol.

These glycols may be used alone or in combination of two or more. Out of these, mainly 1,6-hexanediol, ethylene glycol and neopentyl glycol are preferably used from the viewpoint of ensuring electrical conductivity, and a combination of neopentyl glycol and ethylene glycol is more preferably used. As for the preferred ratio of the neopentyl glycol component and the ethylene glycol component in the polyester as the component C-1, the amount of the neopentyl glycol component is 90 to 10 mol % and the amount of the ethylene glycol component is, 10 to 90 mol % based on 100 mol % of the total of all the glycol components. More preferably, the amount of the neopentyl glycol component is 80 to 20 mol % and the amount of the ethylene glycol component is 20 to 80 mol %.

Preferably, the polyester (component C-1) has an average molecular weight of not less than 5,000. When the average molecular weight is lower than 5,000, heat resistance and mechanical properties may degrade. The upper limit of average molecular weight is preferably higher from the viewpoint of mechanical properties as the polymer is substantially a linear polymer but the actual upper limit of average molecular weight is about 100,000.

The polyester (component C-1) can be obtained by melting an aromatic dicarboxylic acid component having no sulfonate group for inducing the above C1-1 and an ester forming derivative thereof, an aromatic dicarboxylic acid substituted by a sulfonate group for inducing C1-2 and an ester forming derivative thereof, a glycol having 2 to 10 carbon atoms for inducing C1-3, and a poly(alkylene oxide) glycol for inducing C1-4 by heating at 150 to 300° C. in the presence of a transesterification catalyst to carry out a polycondensation reaction.

The transesterification catalyst is not particularly limited if it can be used for an ordinary transesterification reaction. Examples of the transesterification catalyst include antimony compounds such as antimony trioxide, tin compounds such as stannous acetate, dibutyltin oxide and dibutyltin diacetate, titanium compounds such as tetrabutyl titanate, zinc compounds such as zinc acetate, calcium compounds such as calcium acetate, and alkali metal salts such as sodium carbonate and potassium carbonate. Out of these, tetrabutyl titanate is preferably used.

The amount of the above catalyst may be an amount commonly used in an ordinary transesterification reaction, preferably 0.01 to 0.5 mol %, more preferably 0.03 to 0.3 mol % based on 1 mol of the acid component in use.

Preferably, an antioxidant is also used at the time of the reaction. Examples of the antioxidant include pentaerythritol tetrakis(3-mercaptopropionate), pentaerythritol tetrakis(3-laurylthiopropionate), glycerol-3-stearylthiopropionate, triethylene glycol-bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl)propionate], octadecyl-3-(3, 5-di-tert-butyl-4-hydroxyphenyl) propionate, 1,3,5-trimethyl-2,4,6-tris(3,5-di-tert-butyl-4-hydroxybenzyl) benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy] ethyl}-2,4,8,10-tetraoxaspiro(5,5)undecane. The amount of the antioxidant is preferably 0.001 to 0.5 part by weight based on 100 parts by weight of the polyester as the component C-1.

As for the temperature for melting the above components by heating to carry out polycondensation, after an esterification reaction and/or a transesterification reaction are/is carried out at 150 to 200° C. in the initial stage for several tens of minutes to ten and several hours (12-13 hours) while a distillate is distilled off, the polymerization reaction of the obtained reaction product is carried out at 180 to 300° C. to increase its molecular weight. When this temperature is lower than 180° C., the reaction hardly proceeds and when the temperature is higher than 300° C., a side reaction such as decomposition readily occurs. Therefore, the above temperature range is preferred. The polymerization reaction temperature is more preferably 200 to 280° C., particularly preferably 220 to 260° C. The reaction time of this polymerization reaction which depends on the reaction temperature and the polymerization catalyst is generally several tens of minutes to several tens of hours.

(Polyether Ester: Component C-2)

The polyether ester (component C-2) is preferably a polyether ester which comprises (C2-1) a recurring unit derived from an aromatic dicarboxylic acid component having no sulfonate group, (C2-2) a recurring unit derived from an aromatic dicarboxylic acid component substituted by a sulfonate group and represented by the following general formula [1], (C2-3) a recurring unit derived from a glycol component having 2 to 10 carbon atoms, and (C2-4) a recurring unit derived from a poly(alkylene oxide)glycol component having a number average molecular weight of 200 to 50,000.

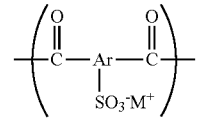

[1]

(In the above formula, Ar is a trivalent aromatic group having 6 to 20 carbon atoms, and $M^+$ is a metal ion or an organic onium ion.)

Examples of the aromatic dicarboxylic acid having no sulfonate group for inducing C2-1 and ester forming derivatives thereof include terephthalic acid, isophthalic acid, naphthalenedicarboxylic acid, biphenyldicarboxylic acid and ester forming derivatives thereof. Examples of the naphthalenedicarboxylic acid and ester forming derivatives thereof include 2,6-naphthalenedicarboxylic acid, 2,7-naphthalenedicarboxylic acid, dimethyl 2,6-naphthalenedicarboxylate, diethyl 2,6-naphthalenedicarboxylate, dimethyl 2,7-naphthalenedicarboxylate and diethyl 2,7-naphthalenedicarboxylate. The hydrogen atom of the aromatic ring of each of these compounds may be substituted by an alkyl group and a halogen atom. The above aromatic dicarboxylic acid components having no sulfonate group for inducing C2-1 may be contained alone or in combination of two or more in the polyether ester.

The recurring unit derived from the aromatic dicarboxylic acid component substituted by a sulfonate group (C2-2) is represented by the above formula [1].

Ar in the above formula [1] is a trivalent aromatic group having 6 to 20 carbon atoms, as exemplified by trivalent benzene ring and naphthalene ring. These rings may have a substituent such as alkyl group, phenyl group, halogen or alkoxy group.

Examples of the aromatic dicarboxylic acid substituted by a sulfonate group for inducing C2-2 and ester forming derivatives thereof include 4-sodium sulfo-isophthalic acid, 5-sodium sulfo-isophthalic acid, 4-potassium sulfo-isophthalic acid, 5-potassium sulfo-isophthalic acid, 2-sodium sulfo-terephthalic acid, 2-potassium sulfo-terephthalic acid, zinc 4-sulfo-isophthalates, zinc 5-sulfo-isophthalates, zinc 2-sulfo-terephthalates, tetraalkylphosphonium 4-sulfo-isophthalates, tetraalkylphosphonium 5-sulfo-isophthalates, tetraalkylammonium 4-sulfo-isophthalates, tetraalkylammonium 5-sulfo-isophthalates, tetraalkylphosphonium 2-sulfo-terephthalates, tetraalkylammonium 2-sulfo-terephthalates, 4-sodium sulfo-2,6-naphthalenedicarboxylic acid, 4-sodium sulfo-2,7-naphthalenedicarboxylic acid, 4-potassium sulfo-2,6-naphthalenedicarboxylic acid, 4-potassium sulfo-2,7-naphthalenedicarboxylic acid, zinc 4-sulfo-2,6-naphthalenedicarboxylates, zinc 4-sulfo-2,7-naphthalenedicarboxylates, tetraalkylammonium 4-sulfo-2,6-naphthalenedicarboxylates, tetraalkylammonium 4-sulfo-2,7-naphthalenedicarboxylates, tetraalkylphosphonium 4-sulfo-2,6-naphthalenedicarboxylates, tetraalkylphosphonium 4-sulfo-2,7-naphthalenedicarboxylates, and dimethyl esters and diethyl esters thereof.

Out of these, dimethyl esters or diethyl esters of an aromatic dicarboxylic acid in which Ar is a benzene ring and $M^+$ is an alkali metal ion such as sodium or potassium ion are preferred from the viewpoints of polymerizability, electrical conductivity and mechanical properties. Specific examples thereof include dimethyl 4-sodium sulfo-isophthalate, dimethyl 5-sodium sulfo-isophthalate, dimethyl 4-potassium sulfo-isophthalate, dimethyl 5-potassium sulfo-isophthalate, dimethyl 2-sodium sulfo-terephthalate and dimethyl 2-potassium sulfo-terephthalate. The above aromatic dicarboxylic acid components substituted by a sulfonate group for inducing C2-2 may be contained alone or in combination of two or more in the polyether ester.

As for the two acid components C2-1 and C2-2 constituting the polyether ester (component C-2), preferably, the amount of the recurring unit derived from the aromatic dicarboxylic acid component having no sulfonate group (C2-1) is 95 to 50 mol % and the amount of the recurring unit derived from the aromatic dicarboxylic acid component substituted by a sulfonate group and represented by the above formula [1] (C2-2) is 5 to 50 mol % based on 100 mol % of the total of all the acid components. When the amount of the component (C2-2) is smaller than 5 mol %, electrical conductivity may become unsatisfactory. When the amount of the component (C2-2) is larger than 50 mol %, the polymerization reaction becomes difficult, whereby a polyether ester having a sufficiently high degree of polymerization is hardly obtained, or handling ease may lower. As for the more preferred ratio of the component C2-1 to the component C2-2, the amount of the component (C2-1) is 92 to 65 mol % and the amount of the component (C2-2) is 8 to 35 mol %. Much more preferably, the amount of the component (C2-1) is 90 to 70 mol % and the amount of the component (C2-2) is 10 to 30 mol %.

Examples of the glycol having 2 to 10 carbon atoms for inducing C2-3 include ethylene glycol, 1,4-butanediol, propylene glycol, 1,6-hexanediol and 3-methyl-1,5-pentanediol. The glycol may contain an ether bond like diethylene glycol or a thioether bond like thiodiethanol.

These glycols may be used alone or in combination of two or more. Out of these, mainly 1,6-hexanediol is preferably used from the viewpoint of an antistatic effect, and a combination of 1,6-hexanediol and ethylene glycol is more preferably used. As for the preferred ratio of the 1,6-hexanediol component and the ethylene glycol component, the amount of the 1,6-hexanediol component is 95 to 50 mol % and the amount of the ethylene glycol component is 5 to 50 mol % based on 100 mol % of the total of all the glycol components. More preferably, the amount of the 1,6-hexanediol component is 90 to 70 mol % and the amount of the ethylene glycol component is 10 to 30 mol %.

The poly(alkylene oxide) glycol for inducing C2-4 which is one of the constituent components of the polyether ester (component C-2) is preferably a poly(alkylene oxide)glycol which comprises poly(ethylene oxide)glycol as the main component. The poly(alkylene oxide)glycol may contain another poly(alkylene oxide)glycol such as poly(propylene oxide)glycol.

The number average molecular weight of the component (C2-4) is preferably 200 to 50,000, more preferably 500 to 30,000, much more preferably 1,000 to 20,000. When the molecular weight is lower than 200, high melt heat stability is not obtained and the advantage obtained by using the polyether ester may not be obtained. From the practical point of view, a molecular weight of about 50,000 suffices. The above poly(alkylene oxide)glycol components may be contained alone or in combination of two or more in the polyether ester.

The amount of the component (C2-4) is preferably 10 to 50 wt %, more preferably 15 to 45 wt %, much more preferably 20 to 40 wt % based on 100 wt % of the polyether ester as the component C-2. When the amount of the component (C2-4) is smaller than 10 wt %, the electrical conductivity of the polyether ester as the component C-2 may become unsatisfactory and when the amount is larger than 50 wt %, high melt heat stability may not be obtained.

The polyether ester (component C-2) preferably has a reduced viscosity measured in a mixed solvent of phenol and tetrachloroethane (weight ratio of 40/60) at 30° C. (concentration of 1.2 g/dl) of not less than 0.3. When the reduced viscosity is lower than 0.3, heat resistance and mechanical properties may degrade. The upper limit of reduced viscosity is preferably higher from the viewpoints of electrical conductivity and mechanical properties as the polymer is substantially a linear polymer but the actual upper limit of reduced viscosity is about 4.0. The reduced viscosity is more preferably not less than 0.4, much more preferably not less than 0.5.

The polyether ester (component C-2) can be produced from the aromatic dicarboxylic acid component having no sulfonate group for inducing C2-1 and an ester forming derivative thereof, the aromatic dicarboxylic acid substituted by a sulfonate group for inducing C2-2 and an ester forming derivative thereof, the glycol having 2 to 10 carbon atoms for inducing C2-3 and the poly(alkylene oxide) glycol for inducing C2-4 through a transesterification reaction like the above polyester as the component C-1, and the above antioxidant may be contained at the time of manufacture.

The above polyether esters (component C-2) and the above polyesters (component C-1) which are each the preferred component C may be used alone or in combination of two or more.

When the resin composition comprises the component C, outgassing properties which are evaluated by a weight loss caused by heating the resin composition becomes satisfactory.

The polyether ester (component C-2) is slightly inferior in heat resistance though it has excellent antistatic properties whereas the polyester (component C-1) is apt to become compatible with the aromatic polycarbonate resin (component A) and is slightly inferior in antistatic properties though it has excellent heat resistance. However, when they are used in combination, their defects can be compensated for by each other. Therefore, it is possible to select a suitable component C according to which property is considered as important out of the above properties. Since a resin composition particularly suitable for use in fields in which a great weight is placed on electrical conductivity and stiffness is provided in the present invention, the polyester having a sulfonate group (component C-1) is particularly preferred as the component C.

The amount of the component C is 0.1 to 5 parts by weight, preferably 0.1 to 4 parts by weight, more preferably 1 to 3 parts by weight based on 100 parts by weight of the total of the components A and B. When the amount is smaller than 0.1 part by weight, outgas reduction property may not be satisfactory and when the amount is larger than 5 parts by weight, melt heat stability may deteriorate.

(Other Additives)
(i) Phosphorus-Based Stabilizer

The resin composition of the present invention may comprise a phosphorus-based stabilizer in an amount that does not impair the object of the present invention. The phosphorus-based stabilizer greatly improves the heat stability of the aromatic polycarbonate resin at the time of manufacture or molding. As a result, mechanical properties, electrical conductivity, flame retardancy and molding stability are improved.

Examples of the phosphorus-based stabilizer include phosphorous acid, phosphoric phosphonous acid, phosphonic acid, esters thereof and tertiary phosphines. Out of these, phosphorous acid, phosphoric acid, phosphonous acid, phosphonic acid, triorganophosphate compounds and acid phosphate compounds are particularly preferred. The organic groups in the acid phosphate compounds include monosubstituents, disubstituents and mixtures thereof. The following compounds corresponding to these compounds also include monosubstituents, disubstituents and mixtures thereof.

The above triorganophosphate compounds include trimethyl phosphate, triethyl phosphate, tributyl phosphate, trioctyl phosphate, tridecyl phosphate, tridodecyl phosphate, trilauryl phosphate, tristearyl phosphate, tricresyl phosphate, triphenyl phosphate, trichlorophenyl phosphate, diphenylcresyl phosphate, diphenylmonoorthoxenyl phosphate and tributoxyethyl phosphate. Out of these, trialkyl phosphates are preferred. The number of carbon atoms of the trialkyl phosphates is preferably 1 to 22, more preferably 1 to 4. Trimethyl phosphate is a particularly preferred trialkyl phosphate.

The above acid phosphate compounds include methyl acid phosphate, ethyl acid phosphate, butyl acid phosphate, butoxy ethyl acid phosphate, octyl acid phosphate, decyl acid phosphate, lauryl acid phosphate, stearyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphate and bisphenol A acid phosphate. Out of these, long-chain dialkyl acid phosphates having 10 or more carbon atoms are preferred because they are effective in improving heat stability and have high stability themselves.

The above phosphite compounds include trialkyl phosphites such as tridecyl phosphite, dialkyl monoaryl phosphites such as didecyl monophenyl phosphite, monoalkyl diaryl phosphites such as monobutyl diphenyl phosphite, triaryl phosphites such as triphenyl phosphite and tris(2,4-di-tert-butylphenyl)phosphite, pentaerythritol phosphites such as distearyl pentaerythritol diphosphite, bis(2,4-di-tert-butylphenyl)pentaerythritol diphosphite, bis(2,4-dicumylphenyl) pentaerythritol diphosphite and bis(2,6-di-tert-butyl-4-methylphenyl)pentaerythritol diphosphite, and cyclic phosphites such as 2,2-methylenebis(4,6-di-tert-butylphenyl)octyl phosphite and 2,2'-methylenebis(4,6-di-tert-butylphenyl)(2,4-di-tert-butylphenyl)phosphite.

The preferred phosphonite compounds include tetrakis (di-tert-butylphenyl)-biphenylene diphosphonite and bis(di-tert-butylphenyl)-phenyl-phenyl phosphonite. Tetrakis(2,4-di-tert-butylphenyl)-biphenylene diphosphonite and bis(2,4-di-tert-butylphenyl)-phenyl-phenyl phosphonite are more preferred. The phosphonite compound may be and is preferably used in combination with a phosphite compound having an aryl group substituted by 2 or more alkyl groups.

The above phosphonate compounds include dimethyl benzenephosphonate, diethyl benzenephosphonate and dipropyl benzenephosphonate. The above tertiary phosphines include triphenyl phosphine.

The amount of the phosphorus-based stabilizer is preferably 0.0001 to 2 parts by weight, more preferably 0.01 to 1 part by weight, much more preferably 0.05 to 0.5 part by weight based on 100 parts by weight of the component A. Preferably, the amount of a trialkyl phosphate and/or an acid phosphate compound is not less than 50 wt % based on 100 wt % of the phosphorus-based stabilizer. Particularly preferably, the amount of a trialkyl phosphate is not less than 50 wt % based on 100 wt % of the phosphorus-based stabilizer.

(ii) Hindered Phenol-Based Stabilizer

When the resin composition of the present invention further comprises a hindered phenol-based stabilizer, it becomes more effective in preventing the deterioration of color at the time of molding or during long-time use. Examples of the hindered phenol-based stabilizer include α-tocopherol, butylhydroxytoluene, cinnapyl alcohol, vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis (4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidene-bis(3-methyl-6-tert-butylphenol), triethylene glycol-N-bis-3-(3-tert-butyl-4-hydroxy-5-methylphenyl)propionate, 1,6-hexanediol-bis[3-(3,5-di-tert-butyl-4-hydroxyphenyl)propionate], bis[2-tert-butyl-4-methyl-6-(3-tert-butyl-5-methyl-2-hydroxybenzyl) phenyl]terephthalate, 3,9-bis{2-[3-(3-tert-butyl-4-hydroxy-5-methylphenyl)propionyloxy]-1,1-dimethylethyl}-2,4,8, 10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxy-hydrocinnamide), N,N'-bis[3-(3,5-di-tert-butyl-4-hydroxyphenyl)propionyl]hydrazine, 1,1,3- tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl)isocyanurate, 1,3,5-tris-2[3(3,5-di-tert-butyl-4-hydroxyphenyl)propionyloxy]ethyl isocyanurate and tetrakis[methylene-3-(3',5'-di-tert-butyl-4-hydroxyphenyl)propionate]methane. All of them are easily acquired. The above hindered phenol-based stabilizers may be used alone or in combination of two or more.

An antioxidant except for the above hindered phenol-based stabilizers may also be used. Examples of the antioxidant include lactone-based stabilizers typified by a reaction product between 3-hydroxy-5,7-di-tert-butyl-furan-2-one and o-xylene (the stabilizer is described in detail in JP-A 7-233160) and sulfur-containing stabilizers such as pentaerythritol tetrakis(3-laurylthiopropionate) and glycerol-3-stearylthiopropionate. The above hindered phenol-based stabilizers may be used alone or in combination of two or more.

The amount of the hindered phenol-based stabilizer or the antioxidant is 0.0001 to 1 part by weight, preferably 0.001 to 0.5 part by weight based on 100 parts by weight of the component A. When the amount of the stabilizer falls below the above range, it is difficult to obtain a good stabilizing effect and when the amount exceeds the above range, the physical properties of the composition may degrade.

(iii) Release Agent

The resin composition of the present invention may comprise a release agent. Examples of the release agent include saturated fatty acid esters, unsaturated fatty acid esters, polyolefin-based waxes (such as polyethylene wax and 1-alkene polymers, what are modified by a functional group-containing compound such as an acid may also be used), silicone compounds, fluorine compounds (fluorine oil typified by polyfluoroalkyl ethers), paraffin wax and beeswax. The amount of the release agent is preferably 0.005 to 2 parts by weight, more preferably 0.01 to 0.8 part by weight based on 100 parts by weight of the component A.

Out of the above release agents, saturated fatty acid esters, particularly partial esters and/or full esters of a higher fatty acid and a polyhydric alcohol are preferred. Full esters are particularly preferred. The term "higher fatty acid" refers to an aliphatic carboxylic acid having 10 to 32 carbon atoms, as exemplified by saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid, docosanoic acid and hexacosanoic acid; and unsaturated aliphatic carboxylic acids such as palmitoleic acid, oleic acid, linoleic acid, linolenic acid, eicosenoic acid, eicosapentaenoic acid and cetoleic acid. Out of these, aliphatic carboxylic acids having 10 to 22 carbon atoms are preferred and aliphatic carboxylic acids having 14 to 20 carbon atoms are more preferred. Saturated aliphatic carboxylic acids having 14 to 20 carbon atoms, especially stearic acid and palmitic acid are particularly preferred. These aliphatic carboxylic acids such as stearic acid are often mixtures containing another carboxylic acid component having a different number of carbon atoms. Ester compounds obtained from stearic acid or palmitic acid in the form of a mixture containing another carboxylic acid component produced from natural oil or fat are preferably used even in the above saturated fatty acid esters.

The polyhydric alcohol as a constituent unit of the saturated fatty acid ester preferably has 3 to 32 carbon atoms.

Examples of the polyhydric alcohol include glycerin, diglycerin, polyglycerin (such as decaglycerin), pentaerythritol, dipentaerythritol, diethylene glycol and propylene glycol.

The acid value of the saturated fatty acid ester is preferably not more than 20 (substantially can be 0), more preferably 2 to 15, much more preferably 4 to 15. The hydroxyl value of the saturated fatty acid ester is preferably 20 to 500 (more preferably 50 to 400). Further, the iodine value is preferably not more than 10 (substantially can be 0). These properties can be obtained by methods specified in JIS K0070.

(iv) Ultraviolet Absorbent

When high light resistance is required for the resin composition of the present invention according to circumstances, the use of an ultraviolet absorbent is effective in this case.

Benzophenone-based ultraviolet absorbents include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrate benzophenone, 2,2'-dihydroxy-4,4'-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Benzotriazole-based ultraviolet absorbents include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl] benzotriazole, and polymers having a 2-hydroxyphenyl-2H-benzotriazole skeleton such as a copolymer of 2-(2'-hydroxy-5-methacryloxyethylphenyl)-2H-benzotriazole and a vinyl-based monomer copolymerizable with this monomer and a copolymer of 2-(2'-hydroxy-5-acryloxyethylphenyl)-2H-benzotriazole and a vinyl-based monomer copolymerizable with this monomer.

Hydroxyphenyltriazine-based ultraviolet absorbents include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol.

Further, compounds having a 2,4-dimethylphenyl group as the phenyl group of the above compounds such as 2-(4,6-bis(2,4-dimethylphenyl)-1,3,5-triazin-2-yl)-5-hexyloxyphenol may also be used.

Cyclic iminoester-based ultraviolet absorbents include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Cyanoacrylate-based ultraviolet absorbents include 1,3-bis-[(2'-cyano-3',3'-diphenylacryloyl)oxy]-2,2-bis[(2- cyano-3,3-diphenylacryloyl)oxy]methyl)propane and 1,3-bis-[(2-cyano-3,3-diphenylacryloyl)oxy]benzene.

When the above ultraviolet absorbent has a radically polymerizable monomer compound structure, it may be a polymer type ultraviolet absorbent obtained by copolymerizing an ultraviolet absorbing monomer and/or an optically stable monomer with a monomer such as an alkyl (meth) acrylate. Preferred examples of the above ultraviolet absorbing monomer include compounds containing a benzotriazole skeleton, benzophenone skeleton, triazine skeleton, cyclic iminoester skeleton or cyanoacrylate skeleton in the ester substituent of a (meth)acrylic acid ester.

A hindered amine-based optical stabilizer typified by bis(2,2,6,6-tetramethyl-4-piperidyl)sebacate and bis(1,2,2,6,6-pentamethyl-4-piperidyl)sebacate may also be used. The amount of the ultraviolet absorbent or the optical stabilizer is preferably 0.01 to 2 parts by weight, more preferably 0.02 to 1 part by weight, much more preferably 0.05 to 0.5 part by weight based on 100 parts by weight of the component A.

(v) Flame Retardant

The resin composition, of the present invention may comprise a flame retardant in an amount that does not impair the object of the present invention. Examples of the flame retardant include brominated epoxy resins, brominated polystyrenes, brominated polycarbonates, brominated polyacrylates, monophosphate compounds, phosphate oligomer compounds, phosphonate oligomer compounds, phosphonitrile oligomer compounds, phosphonic acid amide compounds, organic sulfonic acid metal salts (such as potassium perfluoroalkane sulfonates and potassium diphenylsulfone sulfonates) and silicone-based flame retardants. The flame retardants can be contained in a known amount based on the thermoplastic resin.

As the monophosphate compounds and the phosphate oligomer compounds, one or more phosphorus compounds represented by the following general formula [7] are preferred.

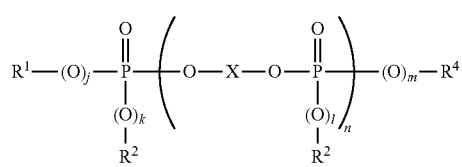

[7]

(In the above formula, X is derived from hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone or bis(4-hydroxyphenyl)sulfide. "j", "k", "l" and "m" are each independently 0 or 1, and "n" is an integer of 0 to 5, or an average value of 0 to 5 in the case of a mixture of phosphates which differ in "n". $R^1$, $R^2$, $R^3$ and $R^4$ are each independently derived from phenol, cresol, xylenol, isopropylphenyl, butylphenol or p-cumylphenol.)

Particularly preferably, X is derived from resorcinol or bisphenol A, "j", "k", "l" and "m" are each 1, "n" is 0 or 1, preferably a numeral infinitely close to 1, and $R^1$, $R^2$, $R^3$ and $R^4$ are each independently derived from phenol or xylenol (especially 2,6-xylenol).

Triphenyl phosphate can be preferably used as the monophosphate compound of the general formula [7], and a phosphate oligomer compound comprising resorcinol bis (dixylenylphosphate) as the main component and a phosphate oligomer compound comprising bisphenol A bis(diphenylphosphate) as the main component can be preferably used as the phosphate oligomer compound because they have high flame retardancy, high flowability at the time of molding and high hydrolizability and rarely experience long-term decomposition.

The amount of the flame retardant is preferably 0.01 to 20 parts by weight, more preferably 2 to 10 parts by weight, much more preferably 2 to 7 parts by weight based on 100 parts by weight of the component A.

The resin composition of the present invention may further comprise a dripping preventing agent typified by polytetrafluoroethylene having fibril formability. The amount of the dripping preventing agent is preferably 0.0001 to 3 parts by weight, more preferably 0.001 to 0.1 part by weight based on 100 parts by weight of the component A.

(vi) Filler

The resin composition of the present invention may comprise a filler as a reinforcing filler as long as the effect of the present invention is obtained. Examples of the filler include calcium carbonate, glass fibers, glass beads, glass balloons, glass milled fibers, glass flakes, fullerene, metal flakes, metal fibers, metal coated glass fibers, metal coated carbon fibers, metal coated glass flakes, silica, metal oxide particles, metal oxide fibers, metal oxide balloons and whiskers (potassium titanate whiskers, aluminum borate whisker and basic magnesium sulfate). These reinforcing fillers may be used alone or in combination of two or more.

In addition to these, the resin composition of the present invention may comprise additives known per se in small amounts so as to provide various functions to a molded article and improve the characteristic properties of a molded article. These additives may be contained in normal amounts as long as the object of the present invention is not impaired.

The additives include a sliding agent (for example, PTFE particles except for the component E), a colorant (for example, a pigment or a dye such as carbon black or titanium oxide), a fluorescent dye, an inorganic phosphor (phosphor containing an aluminate as a mother crystal), an inorganic or organic antibacterial agent, a photocatalyst-based antifouling agent (for example, particulate titanium oxide, particulate zinc oxide), a radical generating agent, an infrared absorbent (heat ray absorbing agent) and a photochromic agent.

(Production of Resin Composition)

The resin composition of the present invention can be produced by an arbitrary method. For example, after the components A to C and optional additives are fully mixed together by using premixing means such as a twin-cylinder mixer, Henschel mixer, mechanochemical device or extrusion mixer, the resulting premixture is optionally granulated by means of an extrusion granulator or a briquetting machine, and then melt kneaded by means of a melt kneader typified by a vented double-screw extruder and pelletized by means of a pelletizer.

Alternatively, a method in which the above components are supplied into a melt kneader typified by a vented double-screw extruder independently or a method in which some of the components are premixed together and supplied into a melt kneader together with the remaining components independently is employed. As the method in which some of the components are premixed together, for example, after components except for the component A are premixed together and the resulting premixture is mixed with the component A or directly supplied into the extruder.

As the premixing method, for example, when the component A is powdery, a method in which some of the powders are blended with additives to produce a master batch of the additives diluted with the powders and the master batch is used may be employed. Further, a method in which one component is supplied at a halfway position of a melt extruder independently may also be employed. When there is a liquid component to be mixed, a liquid injection device or a liquid adder may be used to supply it into a melt kneader.

Further, an extruder having a vent from which water contained in the raw materials and a volatile gas generated from the molten kneaded resin can be removed may be preferably used. A vacuum pump is preferably installed to discharge the generated water or volatile gas to the outside of the extruder from the vent efficiently. A screen for removing foreign matter contained in the extruded raw material may be installed in a zone before the dice of the extruder to remove the foreign matter from the resin composition. Examples of the screen include a metal net, a screen changer and a sintered metal plate (such as a disk filter). Examples of the melt kneader include a Banbury mixer, a kneading roll, a single-screw extruder and a multi-screw extruder having 3 or more screws besides a double-screw extruder.

The resin extruded as described above is directly cut into a pellet or formed into a strand which is then cut with a pelletizer to be pelletized. When it is necessary to reduce the influence of extraneous dust at the time of pelletizing, the atmosphere surrounding the extruder is preferably made clean. The shape of the obtained pellet may be a columnar, square pillar-like or spherical shape but preferably a columnar shape. The diameter of the columnar pellet is preferably 1 to 5 mm, more preferably 1.5 to 4 mm, much more preferably 2 to 3.3 mm. The length of the columnar pellet is preferably 1 to 30 mm, more preferably 2 to 5 mm, much more preferably 2.5 to 3.5 mm.

(Molded Article)

A molded article of the resin composition of the present invention can be obtained by injection molding a pellet of the resin composition. As for injection molding, not only ordinary molding techniques but also injection compression molding, injection press molding, gas assist injection molding, foam molding (including a method for injecting a supercritical fluid), insert molding, in-mold coating molding, insulated runner molding, quick heating and cooling molding, double-color molding, sandwich molding and super high-speed injection molding may be employed. Molding may be of cold runner or hot runner system.

According to the present invention, profile extrusion molded articles, sheets and films can be manufactured by extrusion molding the resin composition. For the molding of a sheet or a film, an inflation, calendering or casting process may also be used. Further, the resin composition may be molded into a heat shrinkable tube by carrying out specific stretching operation. The resin composition of the present invention can be formed into a molded article by rotational molding or blow molding as well.

(Surface Treatment)

The molded article of the present invention may be further subjected to various surface treatments. The surface treatments include hard coating, water-repellent and oil-repellent coating, hydrophilic coating, antistatic coating, ultraviolet absorption coating, infrared absorption coating and metallizing (such as deposition). The surface treatment is carried out by deposition, thermal spraying and plating methods besides the coating of a liquid agent. The deposition method may be either physical deposition or chemical deposition. Examples of the physical deposition method include vacuum deposition, sputtering and ion plating. Examples of the chemical deposition method (CVD) include thermal CVD, plasma CVD and optical CVD.

While a preferred embodiment of the present invention will be described hereinbelow, it is to be understood that this embodiment is illustrative and various modifications may be made without departing from the technical idea of the present invention.

EXAMPLES

The following examples are provided to further illustrate the present invention. The present invention is not limited thereto.

Examples 1 to 12, Comparative Examples 1 to 8

1. Production of Polyether Ester (Component C-2)

150.8 parts of dimethyl 2,6-naphthalene dicarboxylate (component C2-1), 24.9 parts of dimethyl 5-sodium sulfoisophthalate (component C2-2), 47.9 parts of ethylene glycol (component C2-3-1), 74.6 parts of 1,6-hexanediol (component C2-3-2), 89.8 parts of polyethylene glycol (number average molecular weight of 2,000; component C2-4) and 0.14 part of tetrabutyl titanate were fed to a reactor equipped with a fractionating tower and a stirrer, the inside of the reactor was substituted by nitrogen, and the temperature was raised to 200° C. under normal pressure while they were stirred. The temperature was gradually raised from 200° C. to 230° C. over 6 hours while methanol formed by the reaction was distilled off to complete the reaction. Thereafter, the reaction product was transferred to a reactor having a vacuum distillation system equipped with a stirrer, and the inside pressure of the reactor was gradually reduced to $6.7 \times 10^2$ Pa after 60 minutes, $1.3 \times 10^2$ Pa after 100 minutes and 0.67 to $10^2$ Pa after 120 minutes under agitation at 230° C. to carry out a polymerization reaction while the reaction distillate was distilled off so as to obtain a polyether ester copolymer. The obtained polyether ester copolymer had a reduced viscosity of 1.35 (value measured in a mixed solvent of phenol and tetrachloroethane (weight ratio of 40/60) at a concentration of 1.2 (g/dl) and 30° C.). The obtained polyether ester copolymer had a ratio of the component C2-1 to the component C2-2 of 85/15 (molar ratio), a ratio of the component C2-3-1 to the component C2-3-2 of 19:81 (molar ratio) and a component C2-4 content of 26 wt %.

2. Manufacture of Composition Pellet

The composition pellet was manufactured by the following method.

After components shown in Tables 1 and 2 were dry blended in a ratio shown in Table 1 and Table 2, a vented double-screw extruder (TEX-30XSST of The Japan Steel Works, Ltd.) (completely interlocked, spinning in the same direction, double screw) was used. The extrusion conditions included a discharge rate of 15 kg/h, a screw revolution of 150 rpm and a vent vacuum degree of 3 kPa, and the composition was melt kneaded at 280° C. and extruded into a strand which was then cut to obtain a pellet of each composition.

3. Production of Molded Article

The obtained pellet was dried at 120° C. for 5 hours by means of a hot air circulation drier. The dried pellet was molded at a cylinder temperature of 300° C. and a mold temperature of 100° C. by means of an injection molding machine (FAS-T150D of Fanuc Ltd.) having an inner cylinder diameter of 40 mm to form a molded square plate and an air rectifier plate having a width of 50 mm, a length of 90 mm and a thickness of 2 mm. The following electrical conductivity, melt heat stability and outgassing properties of each of these molded articles were measured. The measurement results are shown in Table 1 and Table 2.

4. Evaluation Methods

Values in the examples were obtained by the following methods.

(1) Electrical Conductivity (Surface Resistivity)

(Surface Resistivity of Molded Square Plate)

The molded articles obtained by the above method were measured by using resistivity meters suitable for measuring respective resistance values. That is, the Hiresta UP MCP-HT400 of Mitsubishi Chemical Co., Ltd. (application voltage of 100 V, UR-SS probe (based on JISK6911)) was used in the case of $10^7$ to $10^{15}$ Ω/sq, and the Loresta GP MCP-T600 of Mitsubishi Chemical Co., Ltd. (application voltage of 90 V, ESP probe (based on JISK7194)) was used in the case of less than $10^7$Ω/sq. As a specific measurement method, test samples (length×width×thickness=45 mm×50 mm×2 mm t) were cut out from a molded article, the surface resistivity of a center portion on one side of each of the test samples was measured by using the above resistivity meter at a temperature of 23° C. and a humidity of 50% RH, and the average value of the measurement data of 10 test samples was taken as the surface resistivity of the molded article. The surface resistivity must be less than $1.0 \times 10^{11}$Ω·m.

(Surface Resistivity of Air Rectifier Plate)

The air rectifier plate (length×width×thickness=35 mm×15 mm×2 mm t) of a disk drive shown in FIG. 1 obtained by the above method was used to measure its surface resistivity in the same manner as the molded square plate.

(2) Stiffness (Flexural Modulus)

This was measured in accordance with ISO 178 (measurement condition of 23° C.). A test sample was molded at a cylinder temperature of 300° C. and a mold temperature of 100° C. by means of an injection molding machine (FAS-T150D of Fanuc Ltd.). The flexural modulus must be not less than 4,000 MPa.

(3) Melt Heat Stability (Heat Stability During Melt Molding)

The viscosity average molecular weight of the aromatic polycarbonate resin used as the component A was measured by the method described in this text. A molded article was formed by injection molding at a molding cycle of 600 sec in the above method. The molded article was pulverized to measure its viscosity average molecular weight likewise. The molecular weight of the above molded article was expressed in percentage as molecular weight retention when the molecular weight of the aromatic polycarbonate resin used as the component A was 100%. It can be said that as the molecular weight retention becomes higher, melt heat stability becomes better. The molded article was evaluated as ⊚ when the above molecular weight retention is more than 90%, as ○ when the molecular weight retention is 80 to 90% and as × when the molecular weight retention is less than 80%.

(4) Outgassing Properties (Amount of Outgas)

0.1 g was chipped off from the molded article obtained by the above method, the temperature was elevated from room temperature (23° C.) to 320° C. at a rate of 20° C./min by a thermogravimetric analyzer (TGA2950 of TA Instruments) in a nitrogen gas atmosphere, and the obtained sample was heated at 320° C. for 30 minutes to calculate its weight loss (%) after the test as the amount of outgas. The molded article was evaluated as ⊚ when the amount of outgas was less than 0.1%, as ○ when the amount of outgas was 0.1 to 0.2% and as × when the amount of outgas was more than 0.2%.

The evaluation results of Examples and Comparative Examples are shown in Tables 1 to 2.

The raw materials used in Examples and Comparative Examples are as follows.

(Component A: Aromatic Polycarbonate)

A: linear polycarbonate resin powder having a viscosity average molecular weight of 22,400 (Panlite L-1225WP of Teijin Chemicals Ltd.)

(Component B: Conductive Filler)

B-1: graphite (average particle diameter of 25 μm, average thickness of 0.4 μm, average ratio of length in longitudinal direction to thickness of 68, amount of fixed carbon of 99.6%, volatile matter content of 0.2%, ash content of 0.2%) [UP-20 of Nippon Graphite Industries, Ltd.]

B-2: graphite (average particle diameter of 33 μm, average thickness of 1.0 μm, average ratio of length in longitudinal direction to thickness of 33, amount of fixed carbon of 99.6%, volatile matter content of 0.2%, ash content of 0.2%) [SP-10 of Nippon Graphite Industries, Ltd.]

B-3: graphite (average particle diameter of 8 μm, average thickness of 0.5 μm, average ratio of length in longitudinal direction to thickness of 16, amount of fixed carbon of 98.9%, volatile matter content of 0.4%, ash content of 0.7%) [PS-99 of Nishimura Graphite Inc., Ltd.]

B-4: graphite (average particle diameter of 57 μm, average thickness of 3.3 μm, average ratio of length in longitudinal direction to thickness of 17, amount of fixed carbon of 98.5%, volatile matter content of 0.6%, ash content of 1.0%) [10099M of Nishimura Graphite Inc., Ltd.]

B-5: graphite (average particle diameter of 57 μm, average thickness of 1.6 μm, average ratio of length in longitudinal direction to thickness of 33, amount of fixed carbon of 85.0%, volatile matter content of 2.5%, ash content of 12.5%) [FM-2 of Nishimura Graphite Inc., Ltd.]

B-6: graphite (average particle diameter of 8 μm, average thickness of 0.3 μm, average ratio of length in longitudinal direction to thickness of 33, amount of fixed carbon of 90.0%, volatile matter content of 2.0%, ash content of 8.0%) [PS-90 of Nishimura Graphite Inc., Ltd.]

B-7: graphite (average particle diameter of 4 μm, average thickness of 0.4 μm, average ratio of length in longitudinal direction to thickness of 11, amount of fixed carbon of 99.6%, volatile matter content of 0.4%, ash content of 0.0%) [UP-5NH of Nishimura Graphite Inc., Ltd.]

B-8: graphite (average particle diameter of 62 m, average thickness of 7.0 μm, average ratio of length in longitudinal direction to thickness of 9, amount of fixed carbon of 99.6%, volatile matter content of 0.4%, ash content of 0.0%) [AT-No. 5S of Oriental Sangyo Co., Ltd.]

B-9: carbon fiber (diameter of 7.5 μm, cut length of 6 mm) [Besfight HTA-C6-U of Toho Rayon Co., Ltd.]

(Component C: Polyether Ester Compound, Polyester Compound)

C-1: sodium sulfonate modified polyester (polyethylene terephthalate/isophthalate copolymer containing a sodium 5-sodium sulfoisophthalate unit as a recurring unit, reduced viscosity of 0.54 dl/g, sodium sulfonate group content of about $5.9 \times 10^{-4}$ mole/g) [VYLON 280 of Toyobo Co., Ltd.]

C-2: polyether ester copolymer produced by the above method (reduced viscosity of 1.35 dl/g, sodium sulfonate group content of about $1.5 \times 10^{-4}$ mole/g)

C-3: polyethylene terephthalate resin (TR-4550BH of Teijin Chemicals Ltd.)

TABLE 1

|  |  |  | Unit | Example 1 | Example 2 | Example 3 | Example 4 | Example 5 | Example 6 | Example 7 |
|---|---|---|---|---|---|---|---|---|---|---|
| Composition | Component A | A | parts by weight | 85 | 70 | 70 | 70 | 70 | 85 | 70 |
|  | Component B | B-1 |  | 15 | 30 | 30 | 30 | 30 |  |  |
|  |  | B-2 |  |  |  |  |  |  | 15 | 30 |
|  |  | B-3 |  |  |  |  |  |  |  |  |
|  |  | B-4 |  |  |  |  |  |  |  |  |
|  |  | B-5 |  |  |  |  |  |  |  |  |
|  |  | B-6 |  |  |  |  |  |  |  |  |
|  | Component C | C-1 |  | 1 | 1 | 3 |  | 3 | 1 | 1 |
|  |  | C-2 |  |  |  |  | 1 |  |  |  |
| Characteristic properties | Surface resistivity | Square plate | $\Omega \cdot m$ | $3.0 \times 10^{10}$ | $7.0 \times 10^{6}$ | $5.0 \times 10^{6}$ | $9.0 \times 10^{6}$ | $1.0 \times 10^{7}$ | $7.0 \times 10^{10}$ | $8.0 \times 10^{6}$ |
|  |  | Air rectifier plate |  | — | — | — | — | — | — | — |
|  | Flexural modulus |  | MPa | 4,700 | 8,800 | 9,100 | 8,500 | 8,600 | 4,200 | 7,900 |
|  | Melt heat stability (heat stability during melt molding) |  | — | ◉ | ◉ | ○ | ◉ | ◉ | ◉ | ◉ |
|  | Outgassing properties |  | — | ◉ | ○ | ○ | ○ | ○ | ◉ | ○ |

|  |  |  | Unit | Example 8 | Example 9 | Example 10 | Example 11 | Example 12 |
|---|---|---|---|---|---|---|---|---|
| Composition | Component A | A | parts by weight | 70 | 70 | 70 | 70 | 70 |
|  | Component B | B-1 |  |  |  |  |  | 30 |
|  |  | B-2 |  |  |  |  |  |  |
|  |  | B-3 |  |  | 30 |  |  |  |
|  |  | B-4 |  |  |  | 30 |  |  |
|  |  | B-5 |  |  |  |  | 30 |  |
|  |  | B-6 |  |  |  |  | 30 |  |
|  | Component C | C-1 |  | 1 | 1 | 1 | 1 | 1 |
|  |  | C-2 |  |  |  |  |  |  |
| Characteristic properties | Surface resistivity | Square plate | $\Omega \cdot m$ | $2.0 \times 10^{7}$ | $9.0 \times 10^{10}$ | $8.0 \times 10^{6}$ | $6.0 \times 10^{6}$ | — |
|  |  | Air rectifier plate |  | — | — | — | — | $5.0 \times 10^{6}$ |
|  | Flexural modulus |  | MPa | 9,100 | 7,800 | 8,000 | 8,200 | — |
|  | Melt heat stability (heat stability during melt molding) |  | — | ◉ | ◉ | ◉ | ◉ | — |
|  | Outgassing properties |  | — | ○ | ○ | ○ | ○ | — |

TABLE 2

|  |  |  | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Composition | Component A | A | Parts by weight | 90 | 70 | 70 | 70 | 60 | 70 | 70 | 85 |
|  | Component B | B-1 |  | 10 | 30 | 30 | 30 | 40 |  |  |  |
|  |  | B-2 |  |  |  |  |  |  |  |  |  |
|  | Components other than B | B-7 |  |  |  |  |  |  | 30 |  |  |
|  |  | B-8 |  |  |  |  |  |  |  | 30 |  |
|  |  | B-9 |  |  |  |  |  |  |  |  | 15 |
|  | Component C | C-1 |  |  | 1 |  | 7 | 0.01 | 1 | 1 | 1 |
|  |  | C-2 |  |  |  |  |  |  |  |  |  |
|  | Components other than C | C-3 |  |  |  | 1 |  |  |  |  |  |
| Characteristic properties | Surface resistivity |  | $\Omega \cdot m$ | $4.0 \times 10^{13}$ | $8.0 \times 10^{6}$ | $3.0 \times 10^{6}$ | $8.0 \times 10^{6}$ | $2.0 \times 10^{6}$ | $2.0 \times 10^{12}$ | $2.0 \times 10^{11}$ | $3.0 \times 10^{2}$ |
|  | Flexural modulus |  | MPa | 3,600 | 8,400 | 10,900 | 8,400 | 12,400 | 8,200 | 5,200 | 9,800 |
|  | Melt heat stability (heat stability during melt molding) |  | — | ◉ | X | X | X | X | ◉ | ◉ | ◉ |
|  | Outgassing properties |  | — | ◉ | X | ○ | X | X | ○ | ○ | X |

EFFECT OF THE INVENTION

Since the resin composition of the present invention comprises graphite having a specific shape, it has high stiffness, high electrical conductivity, low anisotropy and excellent dimensional stability. Since the resin composition of the present invention comprises at least one compound (component C) selected from the group consisting of a polyester having a sulfonate group (component C-1) and a polyether ester having a sulfonate group (component C-2), it has high outgas reduction property and high melt heat stability. The resin composition of the present invention also has high stiffness and high electrical conductivity.

The resin composition of the present invention is extremely useful for various industrial fields such as OA equipment and electric and electronic equipment and has excellent characteristic properties for use in fields in which dust must be avoided from electric and electronic equipment and antistatic performance is required for molded articles and fields in which the reduction of outgas generated by heat from equipment is required. The resin composition of the present invention is suitable for use in interior parts of storage AV equipment.

The applications of the resin composition of the present invention include personal computers, notebook personal computers, game machines (such as home-use game machines, coin-op game machines, pachinko machines and slot machines), displays (such as LCD, organic EL, electronic paper, plasma displays and projectors) and transmission parts (typified by the housings of induction coil type transmitters). Printers, copiers, scanners and facsimiles (including composite machines thereof) are also included. VTR cameras, optical film type cameras, digital still cameras, camera lens units, security gadgets and precision instruments such as mobile phones are further included. The resin composition of the present invention is advantageously used in the air rectifier plates of hard disk drives (HDD) and digital versatile disk (DVD) drives.

Further, the resin composition of the present invention is suitable for use in parts for medical equipment such as massage machines and high-oxygen therapeutic apparatuses; home electric appliances such as image recorders (so-called DVD recorders), audio equipment and electronic musical instruments; play machines such as pachinko machines and slot machines; and domestic robots having a precision sensor.

The resin composition of the present invention can be used in car parts, batteries, power generating equipment, circuit boards, integrated circuit molds, optical disk substrates, disk cartridges, optical cards, IC memory cards, connectors, cable couplers, shipping containers for electronic parts (such as IC magazine cases, silicon wafer containers, glass substrate storage containers and carrier tapes), parts for the prevention or removal of static charge (such as the charge roll of an electrophotographic photoreceptor) and mechanical parts (such as gears, turn tables, rotors and screws, including mechanical parts for micromachines).

Therefore, the resin composition of the present invention is extremely useful for industrial fields such as OA equipment and electric and electronic equipment and is of huge industrial value.

The invention claimed is:
1. A resin composition comprising:
  (A) 65 to 85 parts by weight of an aromatic polycarbonate resin (component A);
  (B) 15 to 35 parts by weight of graphite having an average particle diameter of 5 to 60 µm and having an average ratio of length in a longitudinal direction to thickness of 30 to 68 (component B); and
  (C) 0.1 to 5 parts by weight of at least one compound (component C) selected from the group consisting of a polyester having a sulfonate group (component C-1) and a polyether ester having a sulfonate group (component C-2) based on 100 parts by weight of the total of the components A and B,
  wherein the component C-1 is a polyester comprising:
  (C1-1) a recurring unit derived from an aromatic dicarboxylic acid component having no sulfonate group,
  (C1-2) a recurring unit derived from an aromatic dicarboxylic acid component substituted by a sulfonate group and represented by the following general formula [1], and
  (C1-3) a recurring unit derived from a glycol component having 2 to 10 carbon atoms, and
  wherein the component C-2 is a polyether ester comprising:
  (C2-1) a recurring unit derived from an aromatic dicarboxylic acid component having no sulfonate group,
  (C2-2) a recurring unit derived from an aromatic dicarboxylic acid component substituted by a sulfonate group and represented by the following general formula [1],
  (C2-3) a recurring unit derived from a glycol component having 2 to 10 carbon atoms, and
  (C2-4) a recurring unit derived from a poly(alkylene oxide)glycol component having a number average molecular weight of 200 to 50,000,

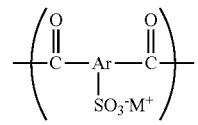

[1]

wherein Ar is a trivalent aromatic group having 6 to 20 carbon atoms, and $M^+$ is a metal ion or an organic onium ion.

2. A molded article formed from the resin composition of claim 1.

3. The molded article according to claim 2 which is a storage AV equipment part.

4. The molded article according to claim 3 which is an air rectifier plate for hard disk drives (HDD) or digital versatile disk (DVD) drives.

5. A method of preventing a weight loss by heating of a resin composition, comprising:
  adding 0.1 to 5 parts by weight based on 100 parts by weight of the total of component A and component B of
  (C) at least one compound (component C) selected from the group consisting of a polyester having a sulfonate group (component C-1) and a polyether ester having a sulfonate group (component C-2)
  to the resin composition comprising:
  (A) 65 to 85 parts by weight of an aromatic polycarbonate resin (component A) and
  (B) 15 to 35 parts by weight of graphite having an average particle diameter of 5 to 60 µm and having an average ratio of length in a longitudinal direction to thickness of 30 to 68 (component B), wherein the component C-1 is a polyester comprising:
(C1-1) a recurring unit derived from an aromatic dicarboxylic acid component having no sulfonate group,
(C1-2) a recurring unit derived from an aromatic dicarboxylic acid component substituted by a sulfonate group and represented by the following general formula [1], and
(C1-3) a recurring unit derived from a glycol component having 2 to 10 carbon atoms, and wherein the component C-2 is a polyether ester comprising:
(C2-1) a recurring unit derived from an aromatic dicarboxylic acid component having no sulfonate group,
(C2-2) a recurring unit derived from an aromatic dicarboxylic acid component substituted by a sulfonate group and represented by the following general formula [1], (C2-3) a recurring unit derived from a glycol component having 2 to 10 carbon atoms, and
(C2-4) a recurring unit derived from a poly(alkylene oxide)glycol component having a number average molecular weight of 200 to 50,000,

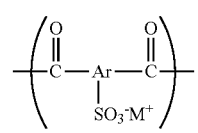
[1]

wherein Ar is a trivalent aromatic group having 6 to 20 carbon atoms, and $M^+$ is a metal ion or an organic onium ion.

* * * * *